United States Patent
Kang et al.

(10) Patent No.: US 11,388,644 B2
(45) Date of Patent: Jul. 12, 2022

(54) APPARATUS AND METHOD FOR LOAD BALANCING IN WIRELESS COMMUNICATION SYSTEM

(71) Applicant: Samsung Electronics Co., Ltd., Suwon-si (KR)

(72) Inventors: Minyoung Kang, Suwon-si (KR); Hyobin Lee, Suwon-si (KR); Kwangwon Ko, Suwon-si (KR); Jongchul Park, Suwon-si (KR); Seonguk Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/953,916

(22) Filed: Nov. 20, 2020

(65) Prior Publication Data

US 2021/0168684 A1    Jun. 3, 2021

(30) Foreign Application Priority Data

Nov. 29, 2019    (KR) .................. 10-2019-0157691

(51) Int. Cl.
*H04W 36/22*    (2009.01)
*H04W 36/08*    (2009.01)
*H04W 28/08*    (2009.01)

(52) U.S. Cl.
CPC ........... *H04W 36/22* (2013.01); *H04W 28/08* (2013.01); *H04W 36/08* (2013.01)

(58) Field of Classification Search
CPC ..... H04W 36/22; H04W 28/08; H04W 36/08; H04W 36/0058; H04W 88/08;
(Continued)

(56) References Cited

U.S. PATENT DOCUMENTS

| | | | | |
|---|---|---|---|---|
| 2009/0163223 A1* | 6/2009 | Casey | ................... | H04W 36/22 455/453 |
| 2015/0141027 A1* | 5/2015 | Tsui | ..................... | H04W 24/02 455/452.1 |

(Continued)

FOREIGN PATENT DOCUMENTS

| | | | | |
|---|---|---|---|---|
| CN | 101765153 A | * | 6/2010 | |
| JP | 2016072715 A | * | 5/2016 | ............ H04W 36/22 |
| KR | 10-1877853 B1 | | 7/2018 | |

*Primary Examiner* — Margaret G Mastrodonato
(74) *Attorney, Agent, or Firm* — Jefferson IP Law, LLP

(57) ABSTRACT

A $5^{th}$ generation (5G) or $6^{th}$ generation (6G) communication system for supporting higher data rates, compared to that of a $4^{th}$ generation (4G) communication system such as a long term evolution (LTE) communication system are provided. An apparatus and a method for load balancing in a wireless communication system are provided. The apparatus includes a transceiver, a memory storing one or more instructions, and at least one processor configured to execute the one or more instructions stored in the memory to receive first information about a relation between a base station (BS) and a user equipment (UE) from each of a plurality of BSs, determine, based on the first information, a number of UEs on which handover has to be performed from among UEs served by each of the plurality of BSs, and transmit, to each of the plurality of BSs, priority information determined based on the number of UEs.

20 Claims, 13 Drawing Sheets

(58) Field of Classification Search
CPC ..... H04W 24/02; H04W 24/10; H04W 88/02; H04W 84/12; H04W 72/042; H04W 24/08; H04W 36/0061; H04W 36/165
See application file for complete search history.

(56) References Cited

U.S. PATENT DOCUMENTS

2020/0169931 A1* 5/2020 Sugai .................... H04W 16/28
2021/0360495 A1* 11/2021 Lovlekar ............... H04W 36/36

* cited by examiner

APPARATUS AND METHOD FOR LOAD BALANCING IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0157691, filed on Nov. 29, 2019, in the Korean Intellectual Property Office, the disclosure of which is incorporated by reference herein in its entirety.

BACKGROUND

1. Field

The disclosure relates to an apparatus and method for load balancing in a wireless communication system.

2. Description of Related Art

Considering the development of wireless communication from generation to generation, the technologies have been developed mainly for services targeting humans, such as voice calls, multimedia services, and data services. Following the commercialization of $5^{th}$-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the $6^{th}$-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for balancing a load in a wireless communication system, whereby a user equipment (UE) can effectively perform handover.

Additional aspects will be set forth in part in the description which follows and, in part, will be apparent from the description, or may be learned by practice of the presented embodiments.

In accordance with an aspect of the disclosure, a reinforcement learning apparatus in a wireless communication system is provided. The reinforcement learning apparatus includes a transceiver, a memory storing one or more instructions, and at least one processor configured to execute the one or more instructions stored in the memory to receive first information about a relation between a base station (BS) and a UE from each of a plurality of BSs, determine, based on the first information, a number of UEs on which handover has to be performed from among UEs served by each of the plurality of BSs, and transmit, to each of the plurality of BSs, priority information determined based on the number of UEs.

The at least one processor may be further configured to execute the one or more instructions to receive, from each of the plurality of BSs, UE handover information about handover of the UEs served by each of the plurality of BSs, based on the priority information transmitted to each of the plurality of BSs, obtain a data throughput per BS with respect to the plurality of BSs, determine an updated number of UEs on which handover has to be performed from among the UEs served by each of the plurality of BS s, based on the UE handover information and the data throughput per BS, and transmit, to each of the plurality of BSs, priority information determined based on the updated number of UEs.

The first information may include at least one of information about a number of UEs connected to each of the plurality of BSs, information about a number of idle-state UEs connected to each of the plurality of BSs, information about a number of active-state UEs connected to each of the plurality of BSs, or information about a total volume of data used by UEs connected to each of the plurality of BSs.

In accordance with another aspect of the disclosure, a BS in a wireless communication system is provided. The BS includes a transceiver, a memory storing one or more instructions, and at least one processor configured to execute the one or more instructions stored in the memory to obtain information about a plurality of BSs based on a measurement report received from at least one UE, the plurality of BSs transmitting a signal with at least preset power to the at least one UE, based on the information about the plurality of BSs, transmit first information about a relation between the BS and the at least one UE to a reinforcement learning apparatus, receive, from the reinforcement learning apparatus, priority information determined based on a number of UEs on which handover has to be performed from among UEs served by the BS, and perform a handover procedure with the at least one UE by transmitting the priority information to the at least one UE.

The at least one processor may be further configured to execute the one or more instructions to transmit a measurement configuration to the at least one UE, receive a first measurement report from the at least one UE, in response to the transmitted measurement configuration, request the at least one UE for information about at least one BS based on the first measurement report, the at least one BS transmitting a signal with at least the preset power, in response to the request for the information, receive, from the at least one UE, a second measurement report including the information about the at least one BS transmitting a signal with at least the preset power, and obtain, based on the second measurement report, the information about the at least one BS that transmits a signal with at least the preset power to the at least one UE.

The at least one processor may be further configured to execute the one or more instructions to, based on the measurement report received from the at least one UE, identify an adjacent BS transmitting a signal with at least the preset power to the at least one UE, request the identified adjacent BS for adjacent BS information, and obtain information about a plurality of BSs by receiving the adjacent BS information from the adjacent BS.

The adjacent BS information may include at least one of information about a number of UEs connected to the adjacent BS, information about a number of idle-state UEs connected to the adjacent BS, information about a number of active-state UEs connected to the adjacent BS, a total volume of data used by UEs connected to the adjacent BS, or information about a ratio of radio resources used by the UEs connected to the adjacent BS.

The at least one processor may be further configured to execute the one or more instructions to identify a number of UEs that have performed handover, based on the priority information, and transmit, to the reinforcement learning apparatus, the identified number of the UEs that have performed handover.

The at least one processor may be further configured to execute the one or more instructions to perform a handover procedure, based on the priority information, and then determine a volume of data usage of the BS, and transmit the determined volume of data usage to the reinforcement learning apparatus.

In accordance with another aspect of the disclosure, a UE is provided. The UE includes a transceiver, a memory storing one or more instructions, and at least one processor connected with the transceiver and configured to execute the one or more instructions stored in the memory to transmit a measurement report to a BS, based on a measurement configuration received from the BS, receive, from the BS, a request for information about at least one adjacent BS transmitting a signal with at least preset power to the UE, transmit, based on the request for the information, a second measurement report including the information about at least one adjacent BS to the BS, receive priority information from the BS, and perform a handover procedure with a new BS, based on the priority information.

The information about the at least one adjacent BS may include at least one of information about a number of UEs connected to the at least one adjacent BS, information about a number of idle-state UEs connected to the at least one adjacent BS, information about a number of active-state UEs connected to the at least one adjacent BS, a total volume of data used by UEs connected to the at least one adjacent BS, or information about a ratio of radio resources used by the UEs connected to the at least one adjacent BS.

The information about the at least one adjacent BS may include an identifier of the at least one adjacent BS transmitting a signal with at least the preset power to the UE.

In accordance with another aspect of the disclosure, an operating method of a reinforcement learning apparatus in a wireless communication system is provided. The operating method includes receiving first information about a relation between a BS and a UE from each of a plurality of BSs, determining, based on the first information, a number of UEs on which handover has to be performed from among UEs served by each of the plurality of BSs, and transmitting, to each of the plurality of BSs, priority information determined based on the number of UEs.

In accordance with another aspect of the disclosure, an operating method of a BS in a wireless communication system is provided. The operating method includes obtaining information about a plurality of BSs based on a measurement report received from at least one UE, the plurality of BSs transmitting a signal with at least preset power to the at least one UE, based on the information about the plurality of BSs, transmitting first information about a relation between the BS and the at least one UE to a reinforcement learning apparatus, receiving, from the reinforcement learning apparatus, priority information determined based on a number of UEs on which handover has to be performed from among UEs served by the BS, and performing a handover procedure with the at least one UE by transmitting the priority information to the at least one UE.

In accordance with another aspect of the disclosure, an operating method of a UE in a wireless communication system is provided. The operating method includes transmitting a measurement report to a BS, based on a measurement configuration received from the BS, receiving, from the BS, a request for information about at least one adjacent BS transmitting a signal with at least preset power to the UE, transmitting, based on the request for the information, a second measurement report including the information about at least one adjacent BS to the BS, receiving priority information from the BS, and performing a handover procedure with a new BS, based on the priority information.

According to an embodiment of the disclosure, provided is a computer-readable recording medium storing one or more programs including instructions that cause, when executed by one or more processors of a reinforcement learning apparatus, the reinforcement learning apparatus to receive first information about a relation between a BS and a UE from each of a plurality of BSs, determine, based on the first information, a number of UEs on which handover has to be performed from among UEs served by each of the plurality of BSs, and transmit, to each of the plurality of BSs, priority information determined based on the number of UEs.

According to an embodiment of the disclosure, provided is a computer-readable recording medium storing one or more programs including instructions that cause, when executed by one or more processors of a BS, the BS to obtain information about a plurality of BSs based on a measurement report received from at least one UE, the plurality of BSs transmitting a signal with at least preset power to the at least one UE, based on the information about the plurality of BSs, transmit first information about a relation between the BS and the at least one UE to a reinforcement learning apparatus, receive, from the reinforcement learning apparatus, priority information determined based on a number of UEs on which handover has to be performed from among UEs served by the BS, and perform a handover procedure with the at least one UE by transmitting the priority information to the at least one UE.

According to an embodiment of the disclosure, provided is a computer-readable recording medium storing one or more programs including instructions that cause, when executed by one or more processors of a UE, the UE to transmit a measurement report to a BS, based on a measurement configuration received from the BS, receive, from the BS, a request for information about at least one adjacent BS transmitting a signal with at least preset power to the UE, transmit, based on the request for the information, a second measurement report including the information about at least one adjacent BS to the BS, receive priority information from the BS, and perform a handover procedure with a new BS, based on the priority information.

An embodiment of the disclosure includes a program stored in a computer-readable recording medium so as to execute the operating methods according to an embodiment of the disclosure, on a computer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
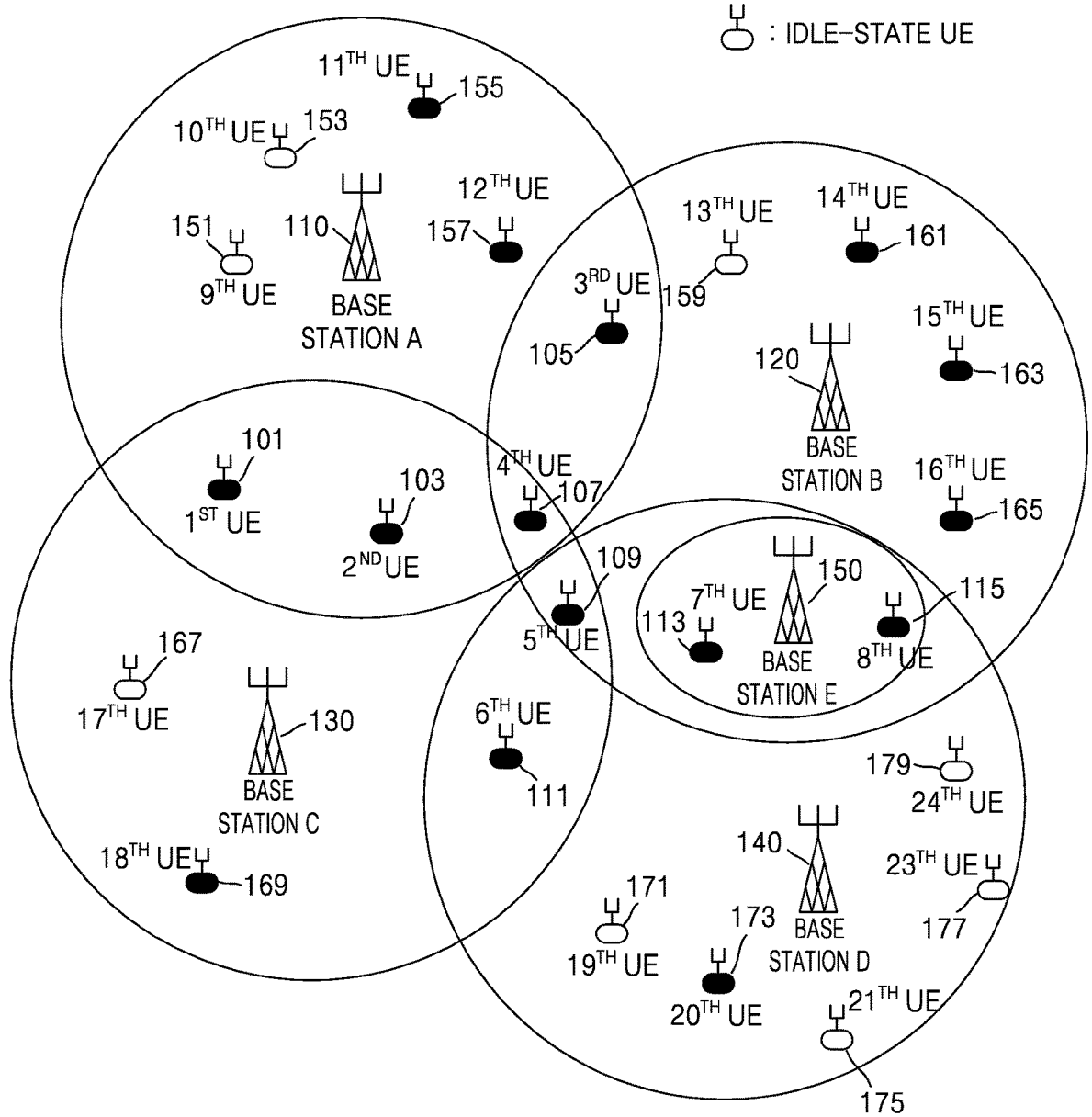
FIG. 1 is a diagram illustrating architecture of a network in which load balancing is performed, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, portions irrelevant to the description will be omitted in the drawings for a clear description of the disclosure, and like reference numerals will denote like elements throughout the specification. Furthermore, connecting lines or connectors between elements shown in drawings are intended to represent functional connection and/or physical or logical connection between the elements. It should be noted that many alternative or additional functional connections, physical connections or logical connections may be present in a practical device.

Although the terms used in the disclosure are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Terms such as "comprise", "include", or "have" are used to specify existence of a recited feature, a number, a process, an operation, a component, a part, and/or combinations thereof, not excluding the existence of one or more other recited features, one or more other numbers, one or more other processes, one or more other operations, one or more other components, one or more other parts, and/or combinations thereof. In particular, numbers are merely an example to support understanding of the disclosure and should not be construed to limit embodiments of the disclosure.

While terms such as "first," "second," etc., may be used to describe various components, such components must not be limited to the above terms. The above terms are used only to distinguish one component from another. The expression "an embodiment" recited in embodiments of the disclosure does not necessarily indicate the same embodiment. Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

An embodiment of the disclosure may be described in terms of functional block components and various processing operations. Some or all of such functional blocks may be implemented by any number of hardware and/or software components configured to perform the specified functions. For example, the functional blocks of the disclosure may be implemented by one or more microprocessors or may be implemented by circuit components for predefined functions. Also, for example, the functional blocks of the disclosure may be implemented with any programming or various scripting languages. The functional blocks may be implemented in algorithms that are executed on one or more processors. Also, the disclosure may employ any number of techniques according to the related art for electronics configuration, signal processing and/or data processing, and the like.

In the descriptions of embodiments, detailed explanations of the related art are omitted when it is deemed that they may unnecessarily obscure the essence of the disclosure. For convenience of description, when necessary, an apparatus and method will be described together.

Hereinafter, terms identifying an access node, terms indicating network entities, terms indicating messages, terms indicating an interface between network entities, and terms indicating various pieces of identification information, as used in the following descriptions, are exemplified for convenience of explanation. Therefore, an embodiment of the disclosure is not limited to terms to be described below, and other terms indicating objects having equal technical meanings may be used.

Hereinafter, for convenience of description, the disclosure uses terms and names defined in the standards for the $5^{th}$ generation (5G) or New Radio (NR) system, and the long term evolution (LTE) system. However, the disclosure is not limited to these terms and names, and may be equally applied to wireless communication systems conforming to other standards.

That is, when particularly describing embodiments of the disclosure, the communication standards defined by the 3GPP are mainly applied but the essential concept of the disclosure may be modified without departing from the scope of the disclosure and may be applied to other communication system based on similar technical backgrounds, and the application may be made based on determination by one of ordinary skill in the art.

Throughout the specification, a terminal or a user equipment may refer to an apparatus to be used by a user and may include a wireless signal receiving apparatus having only a wireless signal receiver without a transmission function, and transceiving hardware having a transmission and reception hardware function for bi-directional communication via a bi-directional communication link. For example, a terminal may refer to a user equipment (UE), a remote terminal, a wireless terminal, a mobile station (MS), or a user device. The terminal may include all types of devices. For example, the terminal may include personal computers, cellular phones, smartphones, Narrowband Internet of Things (NB-IoT) devices, sensors, televisions (TVs), tablet personal computers, notebook computers, Personal Digital Assistants (PDAs), Portable Multimedia Players (PMPs), navigations, MP3 players, digital cameras, black-box devices, devices mounted in a vehicle, modules in the devices mounted in the vehicle, the vehicle itself, or the like. However, the terminal is not limited to the aforementioned examples and may include various devices.

The 5G system according to an embodiment of the disclosure may consist of a 5G core network (hereinafter, referred to as the 5GC or the 5G core network) and a base station.

The 5GC may consist of network functions including an Access and Mobility management Function (AMF), a Session Management Function (SMF), a Proximity-based Services (ProSe) Function, a Network Data Analytics Function (NWDAF), a Policy and Charging Function (PCF), a Network Exposure Function (NEF), Unified Data Management (UDM), a User Plane Function (UPF), a Unified Data Repository (UDR), or the like. According to an embodiment of the disclosure, a network function may refer to a network entity (hereinafter, referred to as the network entity or the NE). The network entity consisting the 5GC may include more or fewer entities than the aforementioned network entities, according to implementation of artificial intelligence (AI).

The base station is an entity that allocates resources to a terminal, and may be at least one of a gNode B (gNB), an eNode B (eNB), a Node B, a base station (BS), a radio access unit, a BS controller, a node on a network, and an access point, but is not limited thereto.

Hereinafter, the disclosure will now be described in detail with reference to the accompanying drawings.

FIG. 1 is a diagram illustrating architecture of a network in which load balancing is performed, according to an embodiment of the disclosure.

Referring to FIG. 1, in an embodiment of the disclosure, a first UE 101, a second UE 103, a third UE 105, a fourth UE 107, a ninth UE 151, a tenth UE 153, an eleventh UE 155, and a twelfth UE 157 may be included in coverage of a BS A 110. A thirteenth UE 159, a fourteenth UE 161, a fifteenth UE 163, and a sixteenth UE 165 may be included in coverage of a BS B 120. A seventeenth UE 167 and an eighteenth UE 169 may be included in coverage of a BS C 130. A nineteenth UE 171, a twentieth UE 173, a twenty-first UE 175, a twenty-third UE 177, and a twenty-fourth UE 179 may be included in coverage of a BS D 140. A sixth UE 111 may be included in coverage of BS C 130 and/or BS D 140.

In an embodiment of the disclosure, the first UE 101, the second UE 103, the third UE 105, the eleventh UE 155, and the twelfth UE 157 from among UEs connected to the BS A 110 may be UEs that are included in the coverage of the BS A 110 and when in an active state may receive a service from the BS A 110. Also, the fourth UE 107 is a UE that receives serving from the BS A 110 but is also included in coverages of a BS B 120 and a BS C 130 and thus can perform handover to the BS B 120 or the BS C 130 and when in an active state. Also, the ninth UE 151 and the tenth UE 153 may be UEs in an idle state which are included in the coverage of the BS A 110 but switch to an idle mode because data transmission or reception does not occur due to a predefined reason or for a preset period of time. In an embodiment of the disclosure, an active state of an entity may refer to a state, e.g., a Radio Resource Control (RRC) connected mode, in which the entity accesses a network and then receives a service. Also, an idle state of the entity may refer to an RRC inactive connected mode or an RRC idle mode. The RRC inactive connected mode may be a connected state to a core side but is an idle state to a radio side. When a UE configured to transmit or receive data in an RRC connected mode does not transmit or receive data due to a predefined reason or for a preset period of time, a BS may transmit an RRCConnectionRelease message to the UE so as to allow the UE to switch to an RRC idle mode. Afterward, when the UE that is not currently configured for connection has data to be transmitted, the UE may perform an RRC connection establishment procedure on the BS. The UE may establish inverse direction transmission synchronization with the BS through a random access procedure, and may transmit an RRCConnectionRequest message to the BS.

In an embodiment of the disclosure, the third UE 105 that receives serving from the BS A 110 may transmit a measurement report to the BS A 110 in a periodic manner or in occurrence of a particular event. The BS A 110 may determine, based on the measurement report, whether the third UE 105 is to perform a handover procedure on an adjacent BS. Handover refers to a technology of changing a serving BS (a source BS) from a current BS to a different new BS (a target BS), the serving BS providing a service to a UE in a connected mode state. When the BS A 110 determines the handover, the BS A 110 may request to perform the handover by transmitting a handover (HO) request message (e.g., a Handover Preparation Information message) to the BS B 120 that is a new BS, i.e., the target BS, to provide a service to the third UE 105. When the BS B 120 accepts the request of handover, the BS B 120 may transmit a HO Request Ack message (e.g., a Handover Command message) to the BS A 110. When the BS A 110 receives the HO Request Ack message, the BS A 110 may transmit a handover command message to the third UE 105. The handover command message may include an RRC Connection Reconfiguration message extracted from a message received by the BS A 110 from the BS B 120.

In an embodiment of the disclosure, the fourth UE 107 may be a UE in an activate state which is included in coverages of the BS A 110, the BS B 120, and the BS C 130. The fourth UE 107 may access a network and receive a service by using the BS B 120. That is, a serving BS of the fourth UE 107 may be the BS B 120. Also, a fifth UE 109 may be included in coverages of the BS B 120, the BS C 130, and a BS D 140, may be a UE in an active state, and may access a network and receive a service by using the BS B 120. When a signal received from the BS B 120 is equal to or less than preset power, the fourth UE 107 or the fifth UE 109 may transmit a measurement report to the BS B 120, based on a measurement configuration received from the BS B 120. When the BS B 120 receives the measurement report from the fourth UE 107, the BS B 120 may request the fourth UE 107 for information about a plurality of BSs that transmit a signal with at least preset power. In an embodiment of the disclosure, power corresponding to a condition of requesting the information about a plurality of BSs that transmit a signal with at least preset power may have a value equal to or different from a value of power corresponding to a condition of transmitting a measurement report when the power is equal to or less than preset power. When the BS B 120 receives the measurement report from the fifth UE 109, the BS B 120 may request the fifth UE 109 for information about a plurality of BSs that transmit a signal with at least preset power. That is, based on a measurement report received from at least one UE, the BS B 120 may request the at least one UE for information about a plurality of BSs that transmit a signal with at least preset power. When the at least one UE receives a request for the information about a plurality of BS, the at least one UE may transmit, to a serving BS, a measurement report including information about one or more adjacent BSs that transmit a signal with at least preset power to the at least one UE. In an embodiment of the disclosure, the information about one or more adjacent BSs may include identifiers of the one or more adjacent BSs that transmit a signal with at least preset power to the at least one UE. In another embodiment of the disclosure, the information about one or more adjacent BSs may include, but is not limited to, the identifiers of the one or more adjacent BSs that transmit a signal with at least preset power, information about the number of UEs connected to each of the one or more adjacent BSs, information about the number of idle-state UEs connected to each of the one or more adjacent BSs, information about the number of active-state UEs connected to each of the one or more adjacent BSs, a total volume of data used by the UEs connected to each of the one or more adjacent BSs, information about an amount of radio resources used by the UEs connected to each of the one or more adjacent BSs, and respective data rates of the one or more adjacent BSs.

For example, the fourth UE 107 is included not only in coverage of the BS B 120 that is a serving BS but also is included in coverages of the BS A 110 and the BS C 130, and thus, the fourth UE 107 may measure power of a signal broadcast from the BS A 110 and the BS C 130, and when the power is equal to or greater than preset power, the fourth UE 107 may transmit identifiers of the BS A 110 and the BS C 130 to the BS B 120 that is a serving BS. Based on the identifiers of the BS A 110 and the BS C 130 received from the fourth UE 107, the BS B 120 may request the BS A 110 and the BS C 130 for information about the number of UEs connected to each of BSs, information about the number of idle-state UEs connected to each of the BSs, information about the number of active-state UEs connected to each of the BSs, a total volume of data used by the UEs connected to each of the BSs, information about a ratio of radio resources used by the UEs connected to each of the BSs, and respective data rates of the BSs and may receive the information. That is, the serving BS may obtain adjacent BS information about an adjacent BS by directly requesting the adjacent BS for the adjacent BS information and receiving the adjacent BS information.

As another example, the fifth UE 109 is included not only in coverage of the BS B 120 that is a serving BS but also is included in coverages of the BS C 130 and the BS D 140, and thus, the fifth UE 109 may measure power of a signal broadcast from the BS C 130 and the BS D 140, and when the power is equal to or greater than preset power, the fifth UE 109 may transmit adjacent BS information about the BS C 130 and the BS D 140 to the BS B 120 that is a serving BS. The adjacent BS information may include, but is not limited to, information about the number of UEs connected to each of adjacent BSs, information about the number of idle-state UEs connected to each of the adjacent BSs, information about the number of active-state UEs connected to each of the adjacent BSs, a total volume of data used by the UEs connected to each of the adjacent BSs, information about a ratio of radio resources used by the UEs connected to each of the adjacent BSs, and respective data rates of the adjacent BSs. That is, the serving BS may obtain adjacent BS information in a manner that the serving BS requests a UE for the adjacent BS information and the UE receives the adjacent BS information from at least one adjacent BS and then transmits the adjacent BS information to the serving BS.

In an embodiment of the disclosure, based on the adjacent BS information, the serving BS may transmit information about a relation between a BS and at least one UE to a reinforcement learning apparatus. The reinforcement learning apparatus may detect the number of UEs connected to each of a plurality of BSs, the number of active-state UEs, e.g., the number of RRC_connected state UEs, from among the UEs connected to each of the plurality of BSs, a total volume of data used by the number of the UEs connected to each of the plurality of BSs, respective data rates of the plurality of BSs, or the like, but information detectable by the reinforcement learning apparatus is not limited thereto. For example, the reinforcement learning apparatus may detect that the number of UEs connected to the BS A 110 is 80, the number of active-state UEs from among the UEs connected to the BS A 110 is 50, and a data rate of the BS A 110 is 40 Mbps. The reinforcement learning apparatus may detect that the number of UEs connected to the BS B 120 is 90, the number of active-state UEs from among the UEs connected to the BS B 120 is 50, and a data rate of the BS B 120 is 30 Mbps. Also, the reinforcement learning apparatus may detect that the number of UEs connected to the BS C 130 is 70, the number of active-state UEs from among the UEs connected to the BS C 130 is 20, and a data rate of the BS C 130 is 60 Mbps. The reinforcement learning apparatus may detect that the number of UEs connected to the BS D 140 is 80, the number of active-state UEs from among the UEs connected to the BS D 140 is 10, and a data rate of the BS D 140 is 70 Mbps. The reinforcement learning apparatus may detect information about a BS E 150, but, because the fourth UE 107 or the fifth UE 109 exists in the outside of coverage of the BS E 150, descriptions about the information about the BS E 150 are not provided here.

In an embodiment of the disclosure, the reinforcement learning apparatus may determine the number of UEs on which handover has to be performed from among UEs served by each of a plurality of BSs, based on information about a relation between a BS and a UE, the information being received from each of the plurality of BSs. Also, the reinforcement learning apparatus may determine priority information, based on the number of UEs on which handover has to be performed. For example, when the reinforcement learning apparatus identifies that the number of RRC_connected state UEs connected to each of the BS A 110 and the BS B 120 is relatively high and their data rates are slower than other BS, the reinforcement learning apparatus may apply low priority to the BS A 110 and the BS B 120, compared to the BS C 130 and the BS D 140. For example, the reinforcement learning apparatus may generate priority information including weights of a plurality of BSs, which is to be referred to by a UE in handover. In this case, the reinforcement learning apparatus may apply low priority to the BS A 110 and the BS B 120, compared to the BS C 130 and the BS D 140. According to an embodiment of the disclosure, because the priority information includes weights of the plurality of BSs, the UE may compare values of load balancing performances due to handover by the plurality of BSs. In an embodiment of the disclosure, the reinforcement learning apparatus may transmit, to the BS B 120, priority information about a plurality of BSs including the BS A 110, the BS B 120, the BS C 130, the BS D 140, and the like. The BS B 120 may transmit the received priority information to the UE, and the UE may perform a handover procedure, based on the priority information. In another embodiment of the disclosure, the reinforcement learning apparatus may transmit a plurality of pieces of priority information about the respective BSs to the respective BSs in a manner that the reinforcement learning apparatus transmits only priority information about the BS B 120 to the BS B 120, transmits only priority information about the BS A 110 to the BS A 110, and transmits only priority information about the BS C 130 to the BS C 130, and each of the BSs may broadcast its own priority information. The UE may perform a handover procedure with a new BS, based on the plurality of pieces of priority information respectively broadcast by the BSs.

In an embodiment of the disclosure, the priority information may include a weight corresponding to a value in a particular area, which may be referred to by the UE while performing handover. For example, in a case where each of the BSs may have a weight value between 0 and 100, the BS D 140 may have a weight value of 90, the BS C 130 may have a value of 60, the BS A 110 may have a value of 30, and the BS B 120 may have a value of 10. In this case, the fourth UE 107 may perform a handover procedure on the BS C 130 as a target BS having a high weight value from among the adjacent BSs included in the priority information, and the fifth UE 109 may perform a handover procedure on the BS D 140 as a target BS having a high weight value from among the adjacent BSs included in the priority information. However, the weight value between 0 and 100 is only an example, and thus the value in the particular area may have a value smaller than 0 and a value greater than 100. Also, the priority information may include not only the weight value in the particular area but also include a priority identifier but is not limited thereto.

In another embodiment of the disclosure, the priority information may include an order of priorities of the plurality of BSs. For example, the BS D 140 may have first priority, the BS C 130 may have second priority, the BS A 110 may have third priority, and the BS B 120 may have fourth priority. In this case, the fourth UE 107 may perform a handover procedure on the BS C 130 as a target BS having high priority from among the adjacent BSs, and the fifth UE 109 may perform a handover procedure on the BS D 140 as a target BS having high priority from among the adjacent BSs.

In an embodiment of the disclosure, a seventh UE 113 and an eighth UE 115 may be present in coverage of the BS B 120, coverage of the BS D 140, and coverage of the BS E 150. The BS E 150 may be a serving BS that provides a service to the seventh UE 113 and the eighth UE 115 that are each in an RRC_connected mode state. In an embodiment of the disclosure, a small cell whose cell coverage radius is small may be added into coverage of an existing cell. In this regard, the existing cell may be referred to as a macro cell because the existing cell has coverage larger than that of the small cell. Due to an increasing demand for a wireless data service, mobile communication operators may use a small cell such as a router or an access point (AP) as a data offloading unit for balancing the amount of traffic or a unit for reducing a shadow zone. The small cell may be mounted in a building or in the outside, thereby extending wireless communication coverage or increasing a network service capacity. For example, the BS E 150 may be the small cell arranged in the BS B 120 that is the macro cell. A plurality of UEs including the seventh UE 113 and the eighth UE 115 may be present in coverage of the BS E 150. Although the number of RRC_connected state UEs in the coverage of the BS E 150 is smaller than the number of RRC_connected state UEs in coverage of another BS, a volume of data used by the plurality of UEs including the seventh UE 113 and the eighth UE 115 in the coverage of the BS E 150 is greater than that of another BS, such that a data rate of the BS E 150 may be decreased. Accordingly, the reinforcement learning apparatus may determine a weight value of priority of the BS E 150 to be lower than those of the BS D 140 and the BS B 120.

For example, when a signal received from the BS E 150 is equal to or less than preset power, at least one UE such as the seventh UE 113, the eighth UE 115, and the like which receives a service from the BS E 150 may transmit a measurement report to the BS E 150, based on a measurement configuration received from the BS E 150. Based on the measurement report received from the at least one UE, the BS E 150 may request the at least one UE for information about a plurality of BSs that transmit a signal with at least preset power. When the at least one UE receives a request for the information about a plurality of BSs, the at least one UE may transmit, to the BS E 150, a measurement report including information about the BS B 120 and the BS D 140 that transmit a signal with at least preset power. Based on the received measurement report, the BS E 150 may transmit the information about the BS B 120 and the BS D 140 to the reinforcement learning apparatus. Based on information about a relation between a BS and a UE, the information being received from each of the BSs, the reinforcement learning apparatus may determine the number of UEs on which handover has to be performed from among UEs that are served by each of the BSs. Also, the reinforcement learning apparatus may determine priority information based on the number of the UEs, and may transmit the priority information to each of the BSs or the BS B 120. In an embodiment of the disclosure, the BS B 120 may transmit the priority information to the at least one UE that transmitted the measurement report. Also, the at least one UE may perform a handover procedure with a new BS, based on the priority information. For example, the reinforcement learning apparatus may determine weights of priorities of the BS B 120, the BS D 140, and the BS E 150 to be 60, 70, and 10, respectively, in consideration of a low data rate of the BS E 150. Accordingly, the seventh UE 113 or the eighth UE 115 may perform a handover procedure on the BS D 140 as a target BS having high weight in the priority information. Alternatively, the seventh UE 113 may perform a handover procedure on the BS D 140 as a target BS, and the eighth UE 115 may perform a handover procedure on the BS B 120 as a target BS. However, this is merely an example, and a BS determined to be a target BS is not limited thereto.

According to an embodiment of the disclosure, a UE that attempts to perform a handover procedure may determine a target BS, based on priorities of a plurality of BSs and a difference between weights of the plurality of BSs.

Also, according to an embodiment of the disclosure, the UE performs handover not only by distributing traffic, in consideration of a load in a multi-frequency band, but also by referring to a difference between loads of BSs, such that data transmission and reception efficiency in a wireless communication system may be improved.

Figure 2:
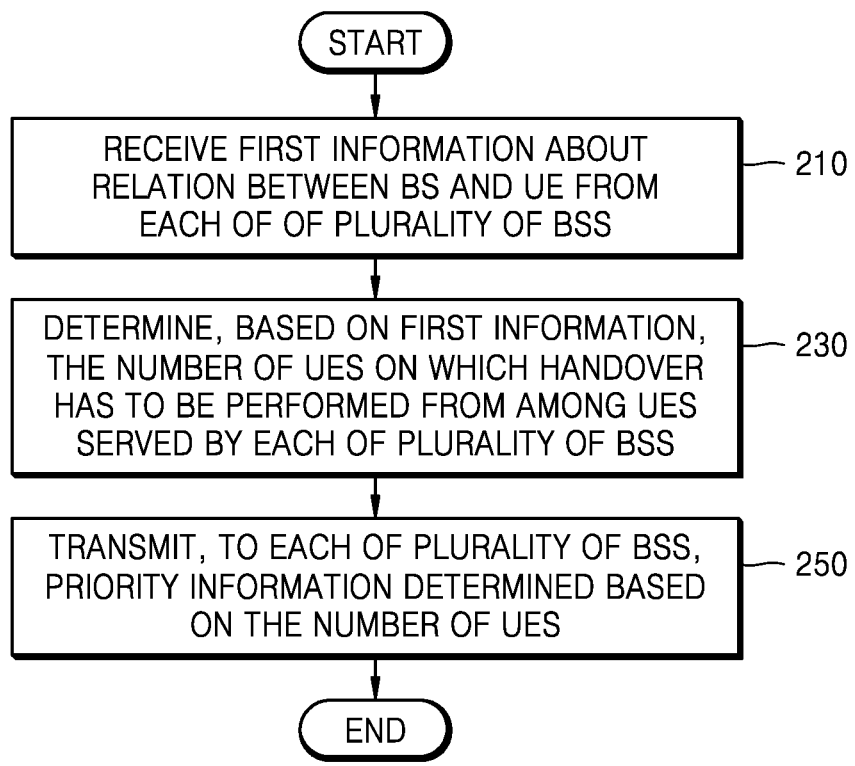
FIG. 2 is a flowchart of a method by which a reinforcement learning apparatus balances a load in a wireless communication system, according to an embodiment of the disclosure.

FIG. 2 is a flowchart of a method by which a reinforcement learning apparatus balances a load in a wireless communication system, according to an embodiment of the disclosure.

Referring to FIG. 2, in operation 210, the reinforcement learning apparatus may receive first information about a relation between a plurality of BSs and at least one UE. In an embodiment of the disclosure, the first information may include, but is not limited to, information about the number of UEs connected to each of BSs, information about the number of idle-state UEs connected to each of the BSs, information about the number of active-state UEs connected to each of the BSs, information about a total volume of data used by UEs connected to each of the BSs, and the like.

In an embodiment of the disclosure, the reinforcement learning apparatus may be included in an entity of a core network, a Mobility Management Entity (MME) or a Serving-Gateway (S-GW) of a LTE system, a Network Data Analytics Function (NWDAF), an Access and Mobility Management Function (AMF) or a User Plane Function (UPF) of a NR system, or all or some of a plurality of BSs, or may refer to a server, a module, or the like which is connected to the entity of the core network and all or some of the plurality of BSs by wire or wirelessly, but the reinforcement learning apparatus is not limited thereto.

The reinforcement learning apparatus may receive information about a relation between a BS and a UE from each of the plurality of BSs. In an embodiment of the disclosure, a server connected to all or some of the plurality of BSs by wired or wireless connection may receive information about a relation between a BS and a UE from all or some of the plurality of BSs. In another embodiment of the disclosure, a server that is a module in a BS may receive, from another module in the BS, a UE, another BS, a core network, etc., information about a relation between a BS and a UE.

In another embodiment of the disclosure, an MME, a NWDAF, or an AMF on a control plane may collect data in a unit of a core network and may balance a load. The MME, the NWDAF, or the AMF may receive information about a relation between a BS and a UE from each of the plurality of BSs. In an embodiment of the disclosure, the MME, the NWDAF, or the AMF may receive a volume of data usage of each of the plurality of BSs from each of the plurality of BSs, or may receive a data throughput of the BS from the S-GW or the UPF, based on the received information about a relation between a BS and a UE.

As another example, the S-GW or the UPF on a user plane may collect data in a unit of a core network and may balance a load. The S-GW or the UPF may receive information about a relation between a BS and a UE from each of the plurality of BSs. In an embodiment of the disclosure, the -GW or the UPF may receive a volume of data usage of each of the plurality of BSs from each of the plurality of BSs, or may calculate a volume of data usage of each of the plurality of BSs.

In an embodiment of the disclosure, the reinforcement learning apparatus may collect data in a unit of a core network and may be trained to learn by using a replay buffer such as Deep Q-Networks (DQN), Storage Area Networks (SAN), or the like. In another embodiment of the disclosure, the reinforcement learning apparatus may be trained by using multiple agents in a unit of a core network, based on an asynchronous method such as the Asynchronous Advantage Actor-Critic Algorithm (A3C) or the like for deep reinforcement learning. According to an embodiment of the disclosure, because the reinforcement learning apparatus is trained in the unit of a core network, the reinforcement learning apparatus may increase efficiency in load balancing in a complex network including many variables such as a state, an action, or the like.

In operation 230, the reinforcement learning apparatus may determine, based on the first information, the number of UEs on which handover has to be performed from among UEs served by each of the plurality of BSs. In an embodiment of the disclosure, the reinforcement learning apparatus may determine the number of UEs on which handover has to be performed from among UEs served by each of the plurality of BSs, based on the number of UEs connected to each of the plurality of BSs, the number of UEs accessing a network and using a service, the number of UEs accessing the network but not using a service, a data throughput per BS, a data transmission and reception rate of a BS, or the like.

In operation 250, the reinforcement learning apparatus may transmit, to each of the plurality of BSs, priority information determined based on the number of UEs. In an embodiment of the disclosure, the priority information may include, but is not limited to, a weight associated with priorities, an indicator associated with the priorities, the number of UEs on which each of the plurality of BSs has to perform handover, an indicator associated with the number of UEs on which each of the plurality of BSs has to perform handover, and the like. Each of the plurality of BSs may receive the priority information from the reinforcement learning apparatus and may transmit the priority information to a UE. The UE may perform a handover procedure, based on the priority information.

In an embodiment of the disclosure, the reinforcement learning apparatus may receive, from each of the plurality of BSs, UE handover information about handover of UEs served by each of the plurality of BSs, based on the priority information transmitted to each of the plurality of BSs. Also, the reinforcement learning apparatus may obtain a data throughput per BS with respect to the plurality of BSs. The reinforcement learning apparatus may determine an updated number of UEs on which handover has to be performed from among the UEs served by each of the plurality of BSs, based on the UE handover information and the data throughput per BS, and may transmit, to each of the plurality of BSs, priority information determined based on the updated number of UEs.

Figure 3:
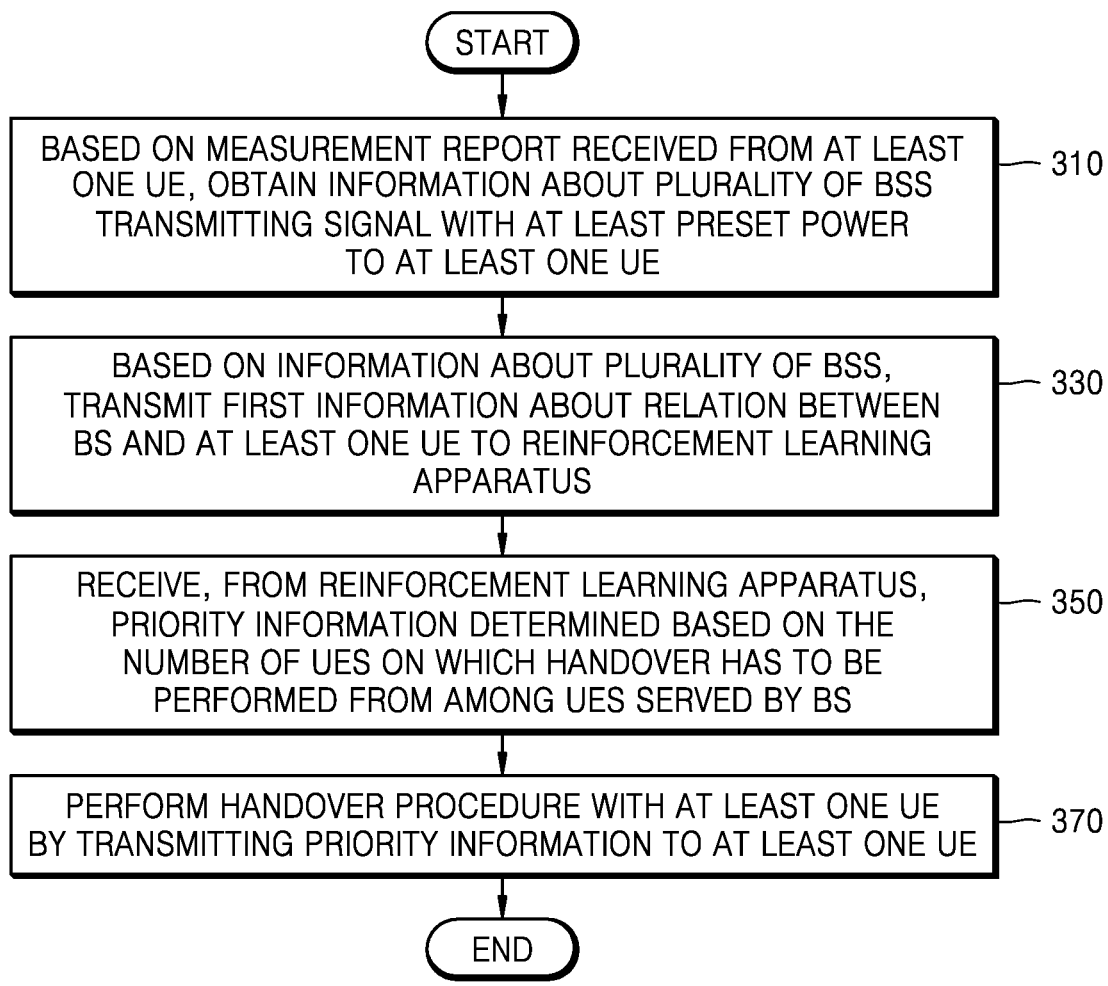
FIG. 3 is a flowchart of a method by which a base station (BS) balances a load in a wireless communication system, according to an embodiment of the disclosure.

FIG. 3 is a flowchart of a method by which a BS balances a load in a wireless communication system, according to an embodiment of the disclosure.

Referring to FIG. 3, in operation 310, the BS may obtain information about a plurality of BSs based on a measurement report received from at least one UE, the plurality of BSs transmitting a signal with at least preset power to the at least one UE. In an embodiment of the disclosure, the BS may transmit, to the at least one UE, a measurement configuration message including information about a target to be measured and whether to transmit, to the BS, a measurement result when the measurement result satisfies a configured criterion. For example, when connected to a UE, the BS may add a measurement configuration to an RRC message and transmit the RRC message to the UE at an appropriate point of time. Based on the received measurement configuration, the UE may transmit a measurement report to the BS when power received from the BS is equal to or less than preset power. Based on the measurement report including information indicating that the signal is equal to or less than preset power, the BS may request the UE for information about at least one BS that transmits a signal with at least preset power and is from among adjacent BSs.

In an embodiment of the disclosure, in response to the request for the information about at least one BS transmitting a signal with at least preset power, the UE may identify at least one adjacent BS that transmits a signal with at least preset power to the UE. The UE may request the identified adjacent BS for adjacent BS information, may receive the adjacent BS information from the adjacent BS, and may transmit the adjacent BS information to the BS.

In another embodiment of the disclosure, in response to a request for information about a BS transmitting a signal with at least preset power, the request being received from a serving BS, the UE may identify at least one adjacent BS that transmits a signal with at least preset power to the UE. Also, the UE may transmit an identifier of the identified adjacent BS to the serving BS. The serving BS may request the adjacent BS for adjacent BS information, based on the identifier of the adjacent BS. In response to the request for the adjacent BS information, the adjacent BS may transmit the adjacent BS information to the serving BS.

In operation 330, based on the information about a plurality of BSs, the BS may transmit first information about a relation between the BS and the at least one UE to the reinforcement learning apparatus. In an embodiment of the disclosure, the first information may include, but is not limited to, information about the number of UEs connected to each of the plurality of BSs, information about the number of idle-state UEs connected to each of the plurality of BSs, information about the number of active-state UEs connected to each of the plurality of BSs, information about a total volume of data used by UEs connected to each of the plurality of BSs, and respective data rates of the plurality of BSs.

In operation 350, the BS may receive, from the reinforcement learning apparatus, priority information determined based on the number of UEs on which handover has to be performed from among UEs served by the BS. In an embodiment of the disclosure, the priority information may be information determined by the reinforcement learning apparatus and may refer to an optimized learning result for balancing a load of a network. The priority information may include, but is not limited to, a weight associated with priorities, an indicator associated with the priorities, the number of UEs on which each of the plurality of BSs has to perform handover, an indicator associated with the number of UEs on which each of the plurality of BSs has to perform handover, and the like.

In operation 370, the BS may perform a handover procedure with at least one UE by transmitting the priority information to the at least one UE. In an embodiment of the disclosure, the at least one UE may select a BS on which a handover procedure is to be performed, based on the priority information, and may perform the handover procedure with the selected BS. For example, the at least one UE may select, as a target BS, a BS having a high weight in an order of priorities, and may perform a handover procedure with the selected BS. A handover procedure refers to a technology of changing a serving BS from a current BS (a source BS) to a different new BS (a target BS), the serving BS providing a service to a UE in a connected mode state.

In an embodiment of the disclosure, the BS may transmit a measurement configuration to the at least one UE. Also, in response to the transmitted measurement configuration, the BS may receive a first measurement report from the at least one UE, and may request the at least one UE for information about at least one BS based on the first measurement report, the at least one BS transmitting a signal with at least preset power. In response to the request for the information, the BS may receive, from the at least one UE, a second measurement report including the information about at least one BS transmitting a signal with at least preset power. Also, the BS may obtain, based on the second measurement report, the information about at least one BS that transmits a signal with at least preset power to the at least one UE.

In an embodiment of the disclosure, based on measurement report received from the at least one UE, the BS may identify an adjacent BS transmitting a signal with at least preset power to the at least one UE, may request the identified adjacent BS for adjacent BS information, and may receive the adjacent BS information from the adjacent BS, thereby obtaining information about a plurality of BSs.

In an embodiment of the disclosure, the adjacent BS information may include, but is not limited to, information about the number of UEs connected to the adjacent BS, information about the number of idle-state UEs connected to the adjacent BS, information about the number of active-state UEs connected to the adjacent BS, a total volume of data used by UEs connected to the adjacent BS, information about a ratio of radio resources used by the UEs connected to the adjacent BS, and a data rate of the adjacent BS, and the like.

In an embodiment of the disclosure, the BS may identify the number of UEs that have performed handover, based on the priority information, and may transmit, to the reinforcement learning apparatus, the identified number of UEs that have performed handover.

In an embodiment of the disclosure, the BS may perform a handover procedure, based on the priority information, may determine a volume of data usage of the BS, and may transmit the determined volume of data usage to the reinforcement learning apparatus.

Figure 4:
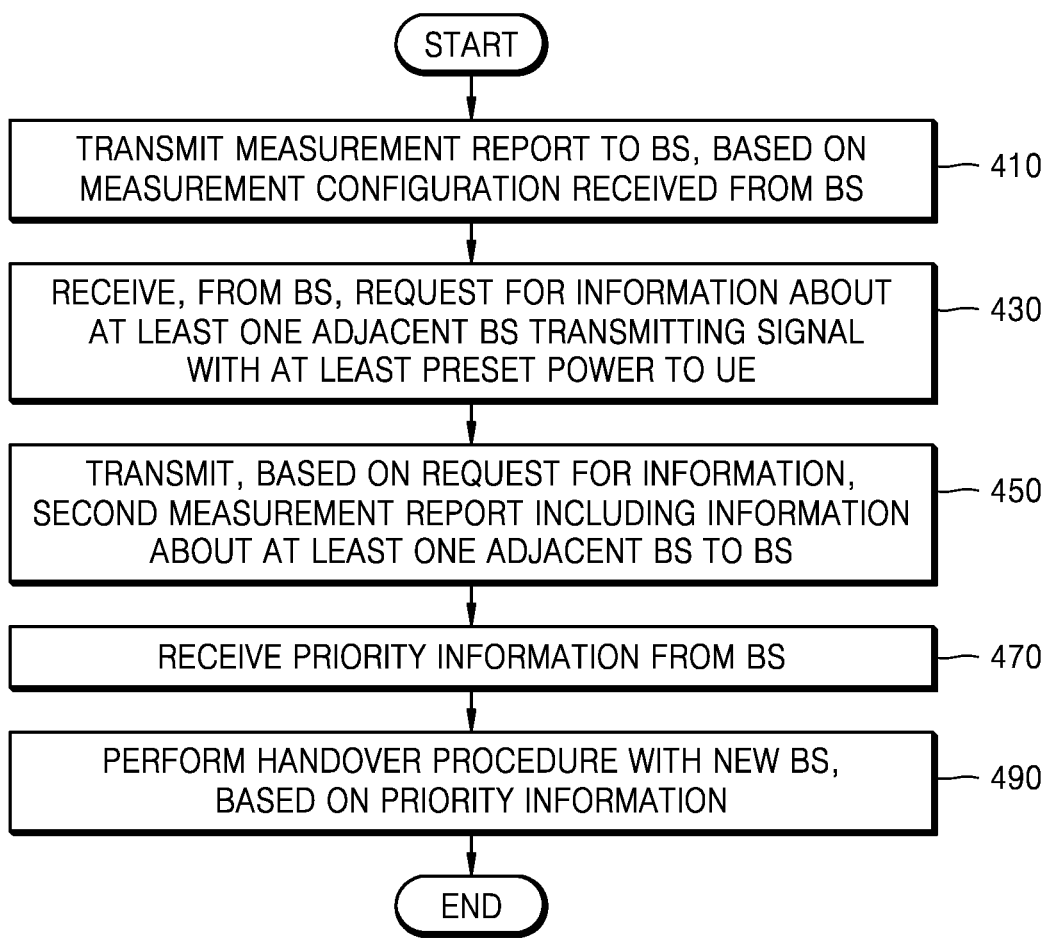
FIG. 4 is a flowchart of a method by which a user equipment (UE) balances a load in a wireless communication system, according to an embodiment of the disclosure.

FIG. 4 is a flowchart of a method by which a UE balances a load in a wireless communication system, according to an embodiment of the disclosure.

Referring to FIG. 4, in operation 410, the UE may transmit a measurement report to a BS, based on a measurement configuration received from the BS. In an embodiment of the disclosure, the UE may receive the measurement configuration from the BS. The measurement configuration refers to information given to the UE from the BS, and may include information about which measurement report is required for the UE to report. For example, the measurement configuration may include, but is not limited to, information about E-UTRA cells the UE has to measure, a number of a frequency channel to be measured, measurement target information including physical Cell identifications (PCIs) of cells to be measured, black list cell ID, an offset value of each cell, or the like, reporting configuration about a condition by which the UE has to transmit a measurement report, an ID for identifying a target to be measured, values to be measured by the UE, a period in which the UE measures neighboring cells, and the like. When a given condition based on the measurement configuration is satisfied based on the reporting configuration about a condition by which the UE has to transmit a measurement report, in the measurement configuration, a measurement event may occur and thus the UE may transmit a measurement report to the BS.

In operation 430, the UE may receive, from the BS, a request for information about at least one adjacent BS transmitting a signal with at least preset power to the UE. In an embodiment of the disclosure, after the BS receives a measurement report indicating that a signal is equal to or less than preset power from the UE, the BS may request the UE for the information about at least one adjacent BS that transmits a signal with at least preset power. Accordingly, the UE may receive, from the BS, the request for the information about at least one adjacent BS transmitting a signal with at least preset power to the UE.

In operation 450, the UE may transmit, based on the request for the information, a second measurement report including the information about at least one adjacent BS to the BS. In an embodiment of the disclosure, the UE may transmit an identifier about at least one adjacent BS transmitting a signal with at least preset power to the UE. In another embodiment of the disclosure, in response to the request for the information, the UE may request adjacent BS information from at least one adjacent BS transmitting a signal with at least preset power, and may receive the adjacent BS information from the at least one adjacent BS. Also, the UE may transmit the received adjacent BS information to the BS. In an embodiment of the disclosure, the adjacent BS information may include, but is not limited to, an identifier of the at least one adjacent BS transmitting a signal with at least preset power to the UE, information about the number of UEs connected to the at least one adjacent BS, information about the number of idle-state UEs connected to the at least one adjacent BS, information about the number of active-state UEs connected to the at least one adjacent BS, a total volume of data used by UEs connected to the at least one adjacent BS, information about a ratio of radio resources used by the UEs connected to the at least one adjacent BS, and the like.

In operation 470, the UE may receive priority information from the BS. In an embodiment of the disclosure, the reinforcement learning apparatus may receive, from the BS, the adjacent BS information, information about a relation between the BS and the UE, or the like. The adjacent BS information may be included in the information about a relation between the BS and the UE. Also, the reinforcement learning apparatus may determine, by using a neural network, the number of UEs on which handover has to be performed from among UEs served by each of a plurality of BSs. The BS may receive the priority information determined based on a number of UEs on which handover has to be performed, the number being determined by the reinforcement learning apparatus. The UE may receive the priority information from the BS, the priority information having been transmitted from the reinforcement learning apparatus.

In operation 490, the UE may perform a handover procedure with a new BS, based on the priority information. In an embodiment of the disclosure, the UE may perform, based on the priority information, a handover procedure with a BS whose priority is higher than another BS whose priority is low. For example, the UE may perform the handover procedure with a BS having highest priority or may perform the handover procedure with a BS having second-highest priority. However, the priority information considered by the UE in handover and a BS on which the UE performs the handover procedure are not limited thereto.

Figure 5:
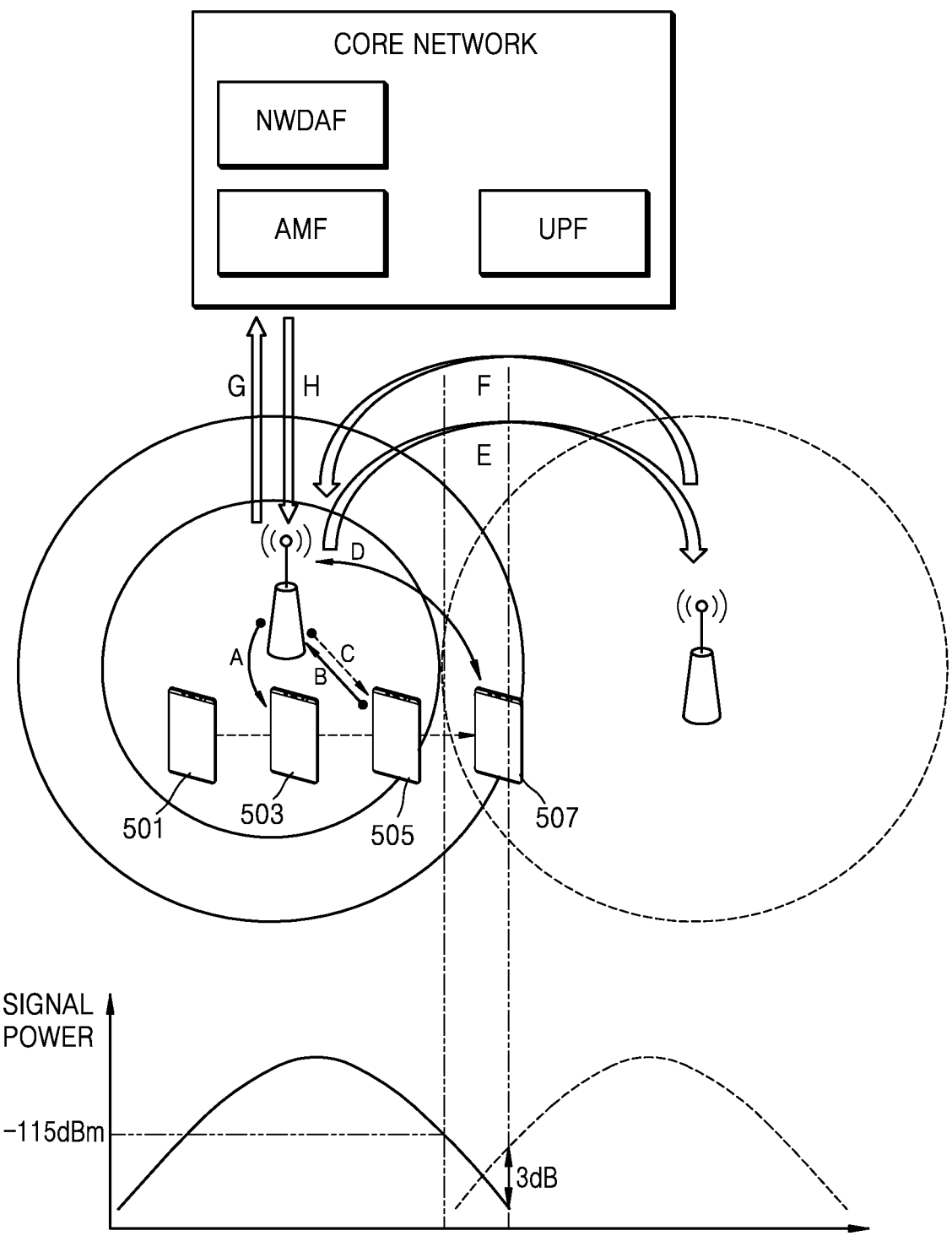
FIG. 5 illustrates a method by which a BS and a UE served by the BS perform handover, according to an embodiment of the disclosure.

FIG. 5 illustrates a method by which a BS and a UE served by the BS perform handover, according to an embodiment of the disclosure.

Referring to FIG. 5, when the UE performs handover, the UE may transmit, to a serving BS, an identifier of an adjacent BS that transmits a signal with at least preset power. Also, the serving BS may request the adjacent BS for adjacent BS information, based on the identifier, and may receive the adjacent BS information from the adjacent BS. The serving BS may transmit the adjacent BS information to a core network including the reinforcement learning apparatus. Also, the serving BS may receive priority information from the reinforcement learning apparatus and then may transmit the priority information to the UE, such that the UE may determine, as a target BS, an optimal BS for load balancing and may perform a handover procedure with the target BS.

In an embodiment of the disclosure, the UE may be an idle-state UE that switched to an idle mode at location 501 because data transmission or reception does not occur due to a predefined reason or for a preset period of time In an embodiment of the disclosure, the UE may switch to a connected-UE capable of accessing a network and using a service at location 503. In an embodiment of the disclosure, the serving BS may transmit, to the UE, a measurement configuration message (A) including information about a target to be measured and whether to transmit, to the serving BS, a measurement result when the measurement result satisfies a configured criterion. For example, when connected to a UE, the serving BS may add a measurement configuration to an RRC message and transmit the RRC message to the UE at an appropriate point of time. The measurement configuration message may include information indicating the UE to transmit a report when a signal from the serving BS is equal to or less than preset power.

In an embodiment of the disclosure, when the UE determines that the signal received from the serving BS is equal to or less than preset power (e.g., at location 505), the UE may transmit a measurement report (B) to the serving BS. In an embodiment of the disclosure, in response to the measurement report, the serving BS may request in message (C) that the UE transmit information about at least one BS transmitting a signal with at least preset power. The UE may transmit, to the serving BS, an identifier of the at least one BS transmitting a signal with at least preset power.

In an embodiment of the disclosure, based on the identifier, the serving BS may request, via an interface (e.g., Xn interface, X2 interface, X2-U interface, etc.), adjacent BS information from the at least one BS transmitting a signal with at least preset power in message (E). When the at least one BS receives the request for the adjacent BS information, the at least one BS may transmit the adjacent BS information to the serving BS in message (F).

In an embodiment of the disclosure, the serving BS may transmit the adjacent BS information to an element of the core network in message (G). For example, the serving BS may directly transmit the adjacent BS information to the NWDAF. In another embodiment of the disclosure, the serving BS may transmit the adjacent BS information to an AMF, and then the AMF that has received the adjacent BS information may transmit the adjacent BS information to the NWDAF. For example, the NWDAF of the core network may be the reinforcement learning apparatus, may have mounted therein a module including the reinforcement learning apparatus, or may communicate with the reinforcement learning apparatus by wired or wireless communication. The reinforcement learning apparatus may determine, based on the adjacent BS information, the number of UEs on which handover has to be performed from among UEs served by each of one or more adjacent BSs. Also, the reinforcement learning apparatus may transmit priority information to the serving BS in message (H) or each of a plurality of BSs including the serving BS, the priority information being determined based on the number of UEs. The serving BS may transmit the received priority information to the UE in location 507 in message (D), and the UE may determine a target BS based on the priority information. Accordingly, the UE may perform a handover procedure with the target BS.

Figure 6:
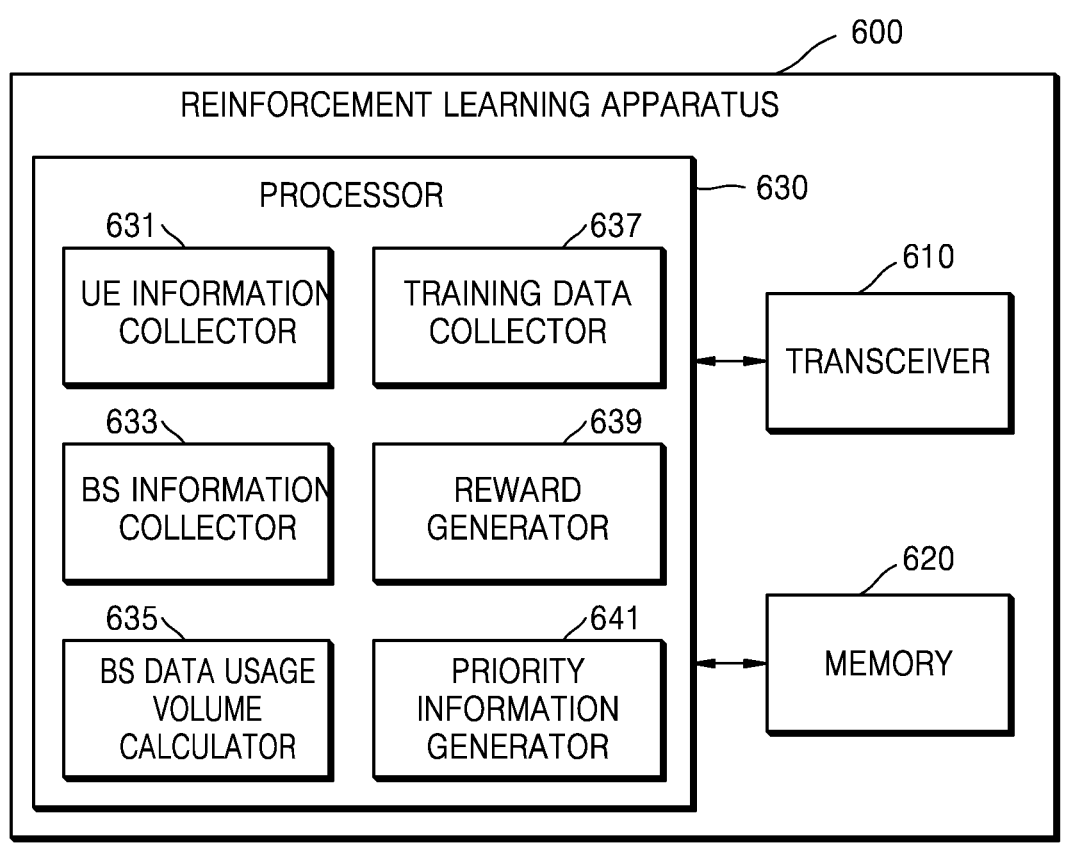
FIG. 6 is a block diagram illustrating a configuration of a reinforcement learning apparatus, according to an embodiment of the disclosure.

FIG. 6 is a block diagram illustrating a configuration of a reinforcement learning apparatus 600, according to an embodiment of the disclosure.

Referring to FIG. 6, the reinforcement learning apparatus 600 may include a transceiver 610, a memory 620, and a processor 630. Also, the processor 630 may include a UE information collector 631, a BS information collector 633, a BS data usage volume calculator 635, a training data collector 637, a reward generator 639, and a priority information generator 641. However, not every element shown in FIG. 6 is an essential element of the reinforcement learning apparatus 600. The reinforcement learning apparatus 600 may be embodied with more elements than the shown elements of FIG. 6 or may be embodied with fewer elements than the shown elements of FIG. 6. Furthermore, the transceiver 610, the memory 620, and the processor 630 may be implemented as one chip.

The processor 630 may refer to one or more processors. In this case, the one or more processors may each be a general-purpose processor such as a central processing unit (CPU), an application processor (AP), a digital signal processor (DSP), or the like, a graphics-dedicated processor such as a graphics processing unit (GPU), a vision processing unit (VPU) or the like, or an AI-dedicated processor such as a neural processing unit (NPU). Alternatively, each of the one or more processors is the AI-dedicated processor, the AI-dedicated processor may be designed to have a hardware structure specialized for processing of a particular AI model.

Also, the processor 630 may control a series of processes to allow the reinforcement learning apparatus 600 to operate according to the aforementioned embodiments of the disclosure. For example, the processor 630 may receive a control signal and a data signal by using the transceiver 610, and may process the received control signal and the received data signal. Also, the processor 630 may transmit the processed control signal and the processed data signal by using the transceiver 610. Also, the processor 630 may control input data to be controlled based on a predefined operation rule or an AI model which are stored in the memory 620, the input data being derived from the received control signal and the received data signal.

The predefined operation rule or the AI model may be made through training. Herein, when the predefined operation rule or the AI model is made through training, it may mean that a basic AI model is trained by using multiple training data based on a learning algorithm so as to execute desired characteristics (or purpose), thus making the predefined operation rule or AI model. Such training may be performed by a BS or network entity on which AI according to the disclosure is implemented or by a separate server and/or a system. Examples of the learning algorithm may include, but are not limited to, supervised learning, unsupervised learning, semi-supervised learning, or reinforcement learning.

The AI model may include a plurality of neural network layers. Each of the plurality of neural network layers has a plurality of weight values, and performs a neural network operation through an operation between an operation result of a previous layer and the plurality of weight values. The plurality of weight values of the plurality of neural network layers may be optimized due to a training result of the AI model. For example, the plurality of weight values may be updated to reduce or minimize a loss value or a cost value obtained by the AI model during a training process. Examples of the AI neural network may include, but are not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), and a DQN.

In an embodiment of the disclosure, the UE information collector 631 may receive, from at least one UE, an identifier of at least one BS transmitting a signal with at least preset power to the at least one UE, information about power or a received signal, or the like. The UE information collector 631 may determine the number of UEs on which handover has to be performed from among UEs served by each of a plurality of BSs, and priority information, by using signal power measured by the at least one UE.

In an embodiment of the disclosure, the BS information collector 633 may obtain information about the number of UEs connected to each of the plurality of BS s, information about the number of idle-state UEs in coverage of each of the plurality of BSs, information about the number of active-state UEs connected to each of the plurality of BSs, information about a total volume of data used by the UEs connected to each of the plurality of BSs, and information about a ratio of radio resources used by the UEs connected to each of the plurality of BSs, but information collected by the BS information collector 633 is not limited thereto.

In an embodiment of the disclosure, the BS data usage volume calculator 635 may determine a volume of data usage or a data throughput, based on a volume of data used by each of the plurality of BSs. Also, the training data collector 637 may collect information about changes in information collected by the UE information collector 631, the BS information collector 633, the BS data usage volume calculator 635, and the like, by changing priorities or weights of the priorities of the plurality of BSs; information about changes in a data throughput of each of the plurality of BSs, in response to changes in the priorities or the weights of the priorities; and the like.

In an embodiment of the disclosure, the reward generator 639 may receive a volume of data usage of each of the plurality of BSs from the BS data usage volume calculator 635 and thus may calculate a reward. The reinforcement learning apparatus 600 may be trained to perform an action so as to receive a higher reward, based on a reward in response to an action.

In an embodiment of the disclosure, the priority information generator 641 may determine the number of UEs on which handover has to be performed, based on the information about the number of UEs connected to each of the plurality of BSs, information about the number of idle-state UEs connected to each of the plurality of BSs, the information about the number of active-state UEs connected to each of the plurality of BSs, the information about a total volume of data used by the UEs connected to each of the plurality of BSs, and the like. Also, the priority information generator 641 may determine priority information, based on the number of UEs on which handover has to be performed. Alternatively, the priority information generator 641 may determine the priority information by receiving a plurality of pieces of information that are necessary for determination of priorities and are received from the training data collector 637, the reward generator 639, and the like.

In an embodiment of the disclosure, a transmitter and a receiver may be collectively referred to as the transceiver 610, and the transceiver 610 may transmit or receive a signal to or from a UE, a BS, or a network entity. The transmitted or received signal may include control information and data. To this end, the transceiver 610 may include a radio frequency (RF) transmitter for up-converting a frequency of and amplifying signals to be transmitted, and an RF receiver for low-noise-amplifying and down-converting a frequency of received signals. However, this is merely an example of the transceiver 610, and thus elements of the transceiver 610 are not limited to the RF transmitter and the RF receiver. Also, the transceiver 610 may receive signals through wired or wireless channels and output the signals to the processor 630, and may transmit signals output from the processor 630, through wired or wireless channels. The reinforcement learning apparatus 600 may provide an interface for performing communication with other devices in a network. That is, the transceiver 610 may convert a bitstream to a physical signal, the bitstream being transmitted to another device, and may convert a physical signal to a bitstream, the physical signal being received from the other device. That is, the transceiver 610 may transmit or receive a signal. Accordingly, the transceiver 610 may be referred to as a modem, a transmitter, a receiver, a communicator, or a communication module. In this regard, the transceiver 610 may allow the reinforcement learning apparatus 600 to communicate with other devices or a system via backhaul connection (e.g., wired backhaul or wireless backhaul), another connection scheme, or the network.

The memory 620 may store programs data necessary for operations of the reinforcement learning apparatus 600. Also, the memory 620 may store control information or data which are included in a signal obtained by the reinforcement learning apparatus 600. Also, the memory 620 may store the predefined operation rule or the AI model which are used by the BS and the network entity. The memory 620 may be implemented as a storage medium including a read only memory (ROM), a random access memory (RAM), a hard disk, a compact disc (CD)-ROM, a digital versatile disc (DVD), or the like, or any combination thereof. Alternatively, the memory 620 may not be separately arranged but may be included in the processor 630.

Figure 7:
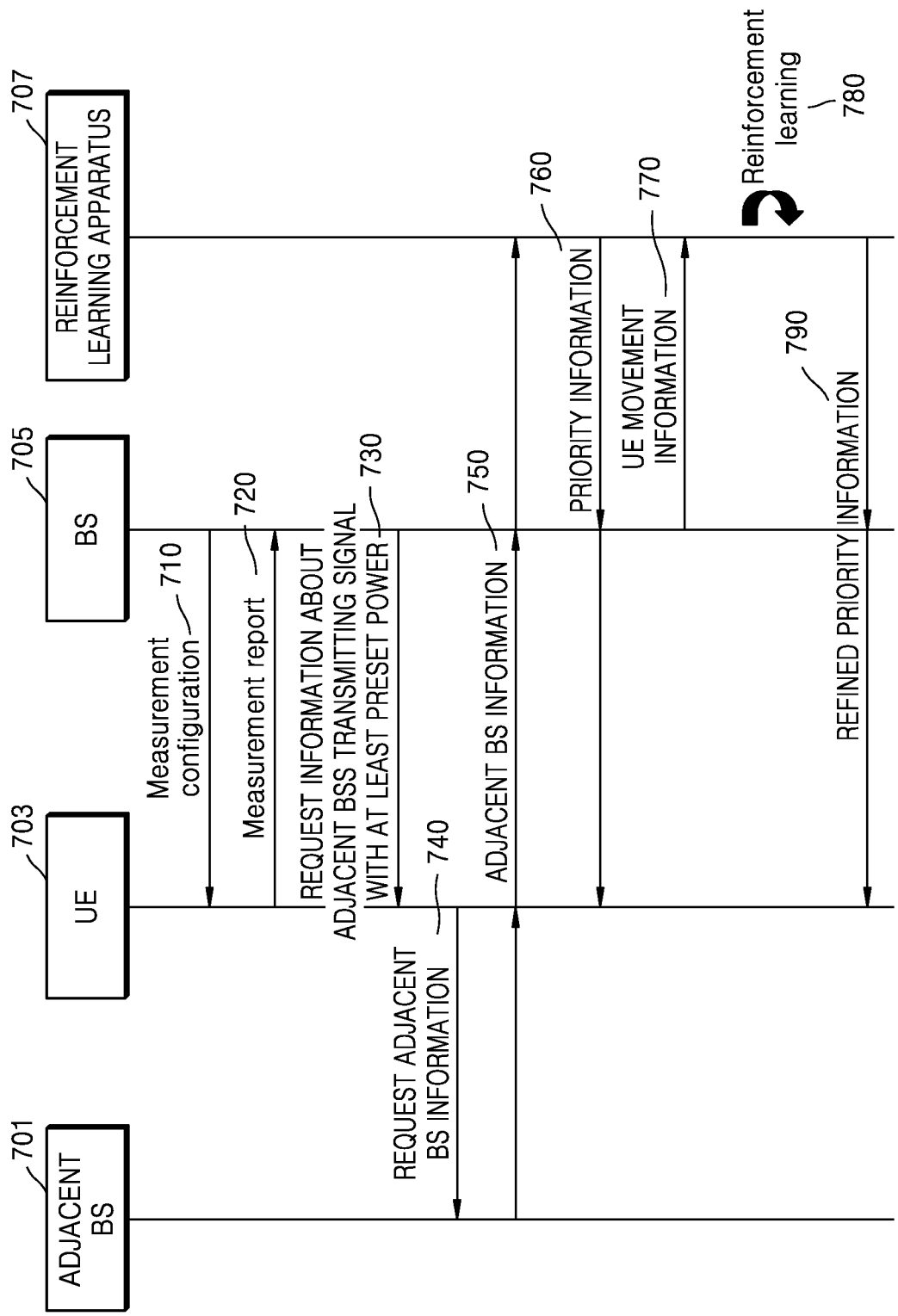
FIG. 7 is a flowchart of a method by which a BS balances a load by receiving adjacent BS information from a UE, according to an embodiment of the disclosure.

FIG. 7 is a flowchart of a method by which a BS 705 balances a load by receiving adjacent BS information from a UE 703, according to an embodiment of the disclosure.

Referring to FIG. 7, in operation 710, the BS 705 may transmit a measurement configuration message to the UE 703. In an embodiment of the disclosure, the BS 705 may transmit, to the UE 703, the measurement configuration message including information indicating to transmit a report when a signal is equal to or less than preset power.

In operation 720, the UE 703 may transmit a measurement report message to the BS 705. In an embodiment of the disclosure, when power of a signal received from the BS 705 is less than the preset power which is indicated by the measurement configuration message, the UE 703 may transmit the measurement report message to the BS 705.

In operation 730, the BS 705 may request the UE 703 for information about at least one adjacent BS transmitting a signal with at least preset power. In an embodiment of the disclosure, the preset power that is a condition of requesting the information about at least one adjacent BS may have a value equal to or different from the preset power that is a condition of the measurement report in operation 710.

In operation 740, the UE 703 may request adjacent BS information from at least one adjacent BS 701 that transmits a signal with at least preset power. In an embodiment of the disclosure, in response to the request received from the BS 705, the UE 703 may request adjacent BS information from at least one adjacent BS that transmits a signal with at least preset power to the UE 703.

In operation 750, the at least one adjacent BS 701 may transmit the adjacent BS information to the UE 703, the UE 703 may transmit the adjacent BS information to the BS 705, and the BS 705 may transmit the adjacent BS information to a reinforcement learning apparatus 707. In an embodiment of the disclosure, adjacent BS information may include, but is not limited to, information about the number of UEs connected to an adjacent BS, information about the number of idle-state UEs connected to the adjacent BS, information about the number of active-state UEs connected to the adjacent BS, a total volume of data used by UEs connected to the adjacent BS, information about a ratio of radio resources used by the UEs connected to the adjacent BS, and a data rate of the adjacent BS, and the like.

In operation 760, the reinforcement learning apparatus 707 may transmit priority information to the BS 705, and the BS 705 may transmit the priority information to the UE 703. Accordingly, the UE 703 may perform a handover procedure with a new BS.

In operation 770, the BS 705 may transmit, to the reinforcement learning apparatus 707, UE movement information based on handover of the UE 703. The reinforcement learning apparatus 707 may detect information between the BS 705 and the UE 703 after a preset period of time, and may obtain a data throughput of the BS 705.

In operation 780, the reinforcement learning apparatus 707 may determine priority information refined by using reinforcement learning. In an embodiment of the disclosure, when a data throughput is increased, the reinforcement learning apparatus 707 may identify that a higher reward is obtained, and when a data throughput is decreased, the reinforcement learning apparatus 707 may identify that a lower reward is obtained. Accordingly, the reinforcement learning apparatus 707 may determine newly-refined priority information.

In operation 790, the reinforcement learning apparatus 707 may transmit the refined priority information to the BS 705, and the BS 705 may transmit the refined priority information to the UE 703. In an embodiment of the disclosure, the UE 703 may perform a handover procedure with a new target BS, based on the refined priority information.

Figure 8:
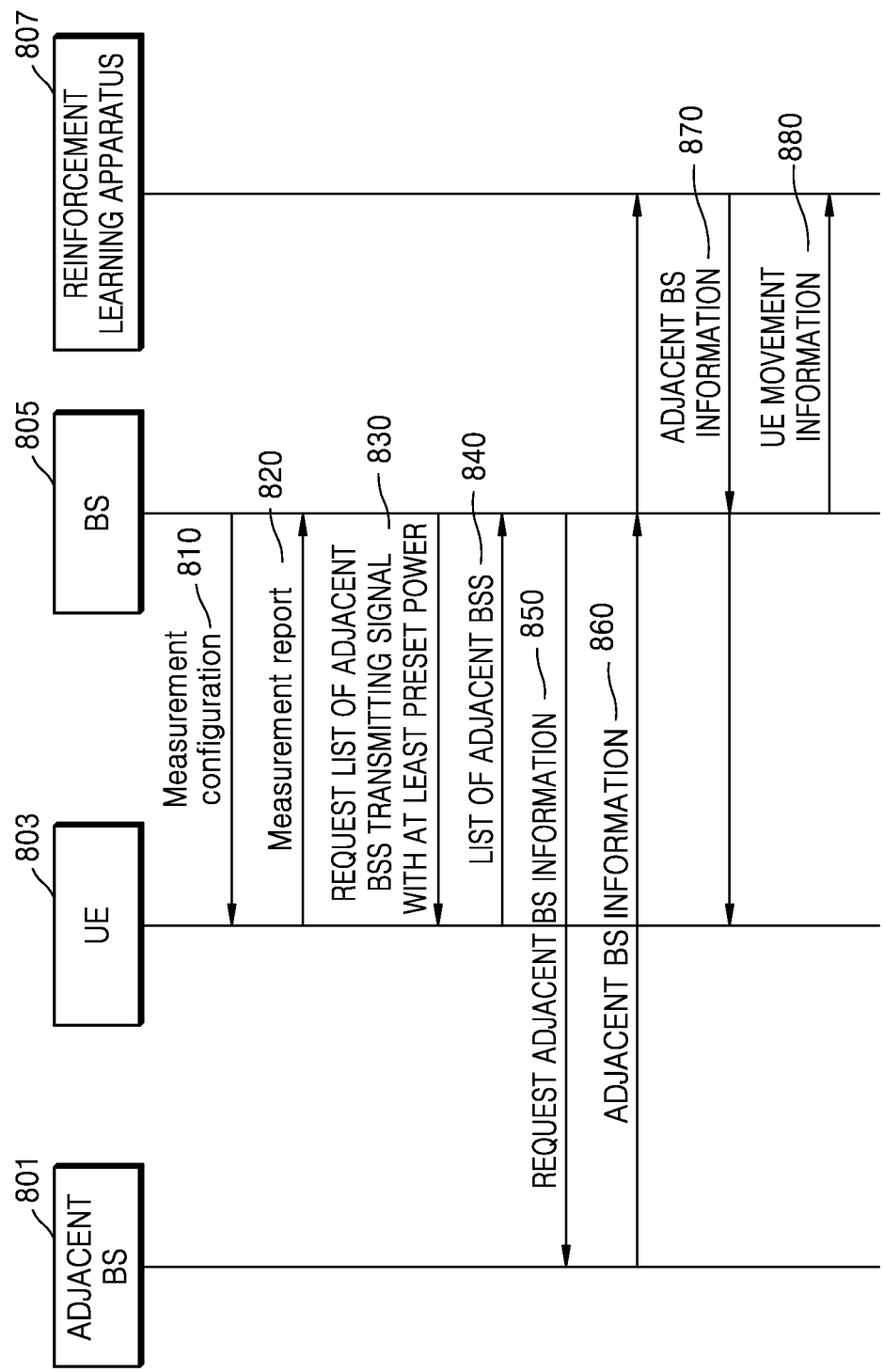
FIG. 8 is a flowchart of a method by which a BS balances a load by receiving adjacent BS information from an adjacent BS, according to an embodiment of the disclosure.

FIG. 8 is a flowchart of a method by which a BS 805 balances a load by receiving adjacent BS information from an adjacent BS 801, according to an embodiment of the disclosure.

Referring to FIG. 8, in operation 810, the BS 805 may transmit a measurement configuration message to a UE 803. In an embodiment of the disclosure, the BS 805 may transmit, to the UE 803, the measurement configuration message including information indicating to transmit a report when a signal is equal to or less than preset power.

In operation 820, the UE 803 may transmit a measurement report message to the BS 805. In an embodiment of the disclosure, when power of a signal received from the BS 805 is less than the preset power indicated by the measurement configuration message, the UE 803 may transmit the measurement report message to the BS 805.

In operation 830, the BS 805 may request the UE 803 for a list of at least one adjacent BS transmitting a signal with at least preset power. According to an embodiment of the disclosure, when it is difficult for the UE 803 to obtain adjacent BS information such as the number of UEs connected to the adjacent BS 801, the BS 805 may request the UE 803 for only the list of at least one adjacent BS transmitting a signal with at least preset power, and may directly request the adjacent BS 801 for adjacent BS information, such that complexity of the UE 803 may be decreased. In an embodiment of the disclosure, the preset power that is a condition of requesting the list of at least one adjacent BS may have a value equal to or different from the preset power that is a condition of the measurement report in operation 810.

In operation 840, the UE 803 may transmit, to the BS 805, the list of at least one adjacent BS transmitting a signal with at least preset power.

In operation 850, the BS 805 may request the adjacent BS 801 for adjacent BS information. In an embodiment of the disclosure, based on the list of at least one adjacent BS which is received from the UE 803, the BS 805 may request adjacent BS information from at least one adjacent BS that transmits a signal with at least preset power to the UE 803.

In operation 860, the adjacent BS 801 transmitting a signal with at least preset power to the UE 803 may transmit the adjacent BS information to the BS 805. Also, the BS 805 may transmit the adjacent BS information to a reinforcement learning apparatus 807. In an embodiment of the disclosure, adjacent BS information may include, but is not limited to, information about the number of UEs connected to an adjacent BS, information about the number of idle-state UEs connected to the adjacent BS, information about the number of active-state UEs connected to the adjacent BS, a total volume of data used by UEs connected to the adjacent BS, information about a ratio of radio resources used by the UEs connected to the adjacent BS, and the like.

In operation 870, the reinforcement learning apparatus 807 may determine, based on the adjacent BS information, the number of UEs on which handover has to be performed from among UEs served by each of the adjacent BS 801. Also, the reinforcement learning apparatus 807 may transmit, to each of a plurality of BSs, priority information determined based on the determined number of UEs. The BS 805 may transmit, to the UE 803, the priority information received from the reinforcement learning apparatus 807.

In operation 880, the BS 805 may transmit, to the reinforcement learning apparatus 807, UE movement information that is generated according to a result of a handover procedure performed between the UE 803 and a new BS based on the priority information.

Figure 9:
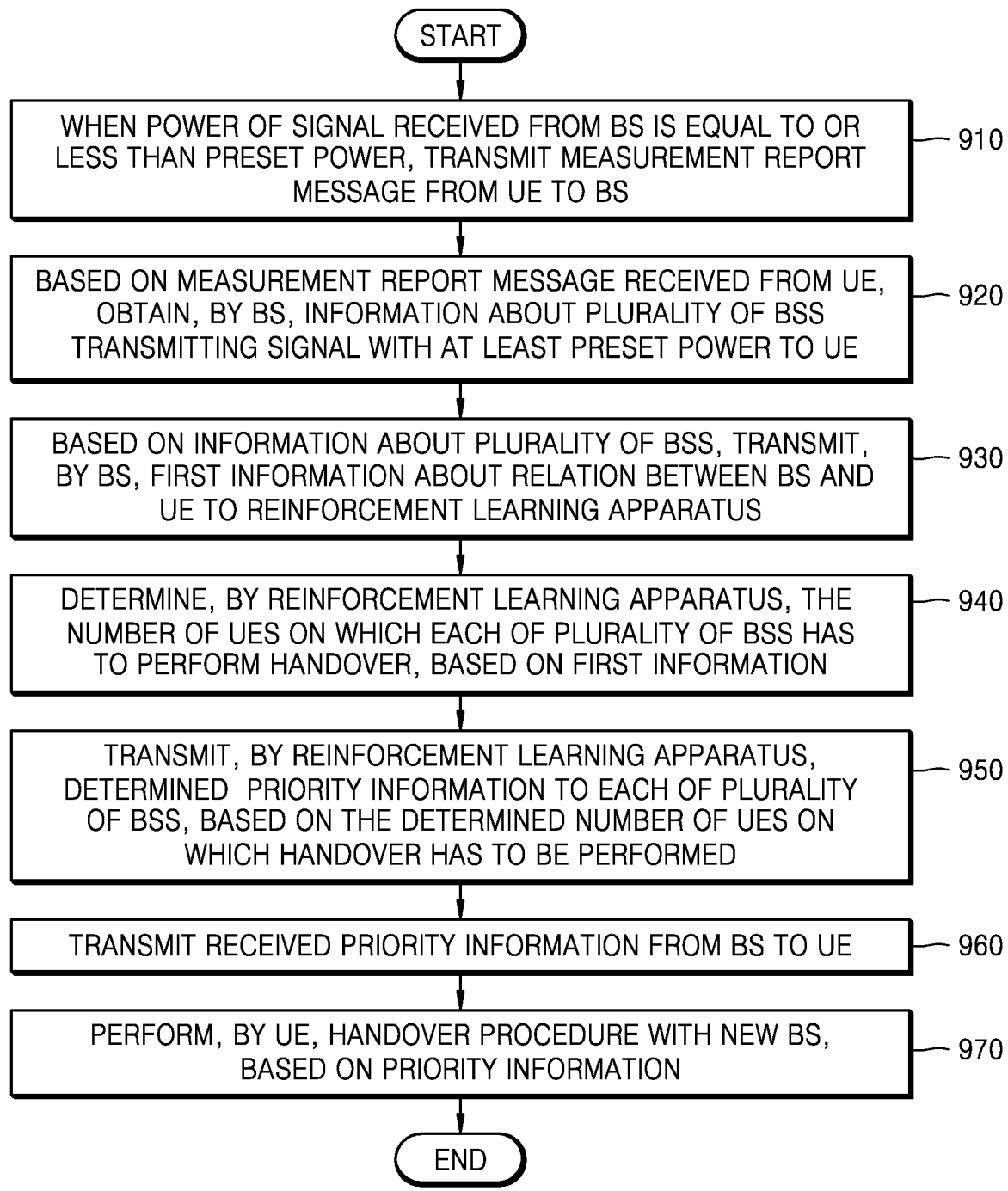
FIG. 9 is a flowchart illustrating a method of balancing a load in a wireless communication system, according to an embodiment of the disclosure.

FIG. 9 is a flowchart illustrating a method of balancing a load in a wireless communication system, according to an embodiment of the disclosure.

Referring to FIG. 9, in operation 910, when power of a signal received from a BS is equal to or less than preset power, a UE may transmit a measurement report message to the BS. That is, the UE may transmit, to the BS, a report message indicating that the power of the signal received from the BS is decreased under the preset power, thereby notifying necessity of handover.

In operation 920, based on the measurement report message received from the UE, the BS may obtain information about a plurality of BSs transmitting a signal with at least preset power to the UE. The BS may request the UE for the information about a plurality of BSs transmitting a signal with at least preset power to the UE. In an embodiment of the disclosure, the UE may request and receive the information about the plurality of BSs transmitting a signal with at least preset power from the plurality of BSs, and may transmit the received information to the BS. In another embodiment of the disclosure, the UE may transmit, to the BS, a list of the plurality of BSs transmitting a signal with at least preset power, and based on the received list, the BS may request and receive information about each of the plurality of BSs from the plurality of BSs.

In operation 930, based on the information about the plurality of BSs, the BS may transmit first information about a relation between the plurality of BSs and the UE to a reinforcement learning apparatus. In an embodiment of the disclosure, the first information may include, but is not limited to, information about the number of UEs connected to each of a plurality of BSs, information about the number of idle-state UEs connected to each of the plurality of BSs, information about the number of active-state UEs connected to each of the plurality of BSs, information about a total volume of data used by UEs connected to each of the plurality of BSs, and the like.

In operation 940, the reinforcement learning apparatus may determine, based on the first information, the number of UEs on which each of the plurality of BSs has to perform handover. In an embodiment of the disclosure, based on the number of UEs connected to each of the plurality of BSs, the number of UEs actually transmitting or receiving data from among the UEs connected to each of the plurality of BSs, a data throughput of each of the plurality of BSs, and respective data rates of the plurality of BSs, the reinforcement learning apparatus may determine the number of UEs on which each of the plurality of BSs has to perform handover.

In operation 950, the reinforcement learning apparatus may transmit, to each of the plurality of BSs, priority information determined based on the determined number of UEs on which handover has to be performed. For example, the reinforcement learning apparatus may determine a BS with a fast data rate to have high priority, and may determine a BS with a slow data rate to have low priority. However, a method of determining priorities is not limited thereto. The reinforcement learning apparatus may transmit the determined priority information to each of the plurality of BSs.

In operation 960, the BS may receive the priority information from the reinforcement learning apparatus and may transmit the received priority information to the UE.

In operation 970, the UE may perform a handover procedure with a new BS, based on the priority information received from the BS. In an embodiment of the disclosure, the UE may perform the handover procedure with a BS having high priority from among the plurality of BSs transmitting a signal with at least preset power. In another embodiment of the disclosure, the UE may perform the handover procedure with a BS whose weight of priority is high from among the plurality of BSs transmitting a signal with at least preset power.

Figure 10:
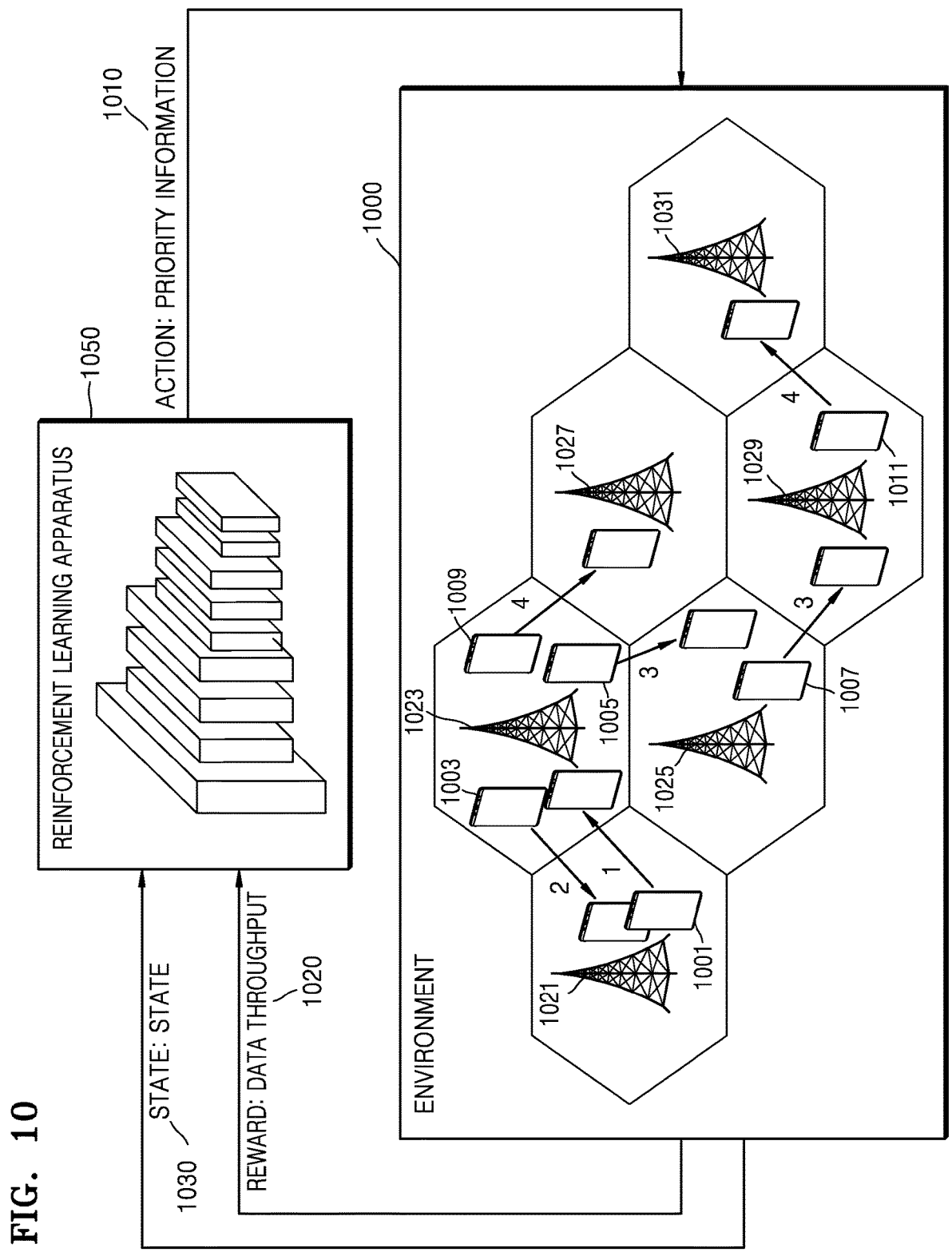
FIG. 10 illustrates a scheme by which a reinforcement learning apparatus is trained to balance a load of a network, according to an embodiment of the disclosure.

FIG. 10 illustrates a scheme by which a reinforcement learning apparatus is trained to balance a load of a network, according to an embodiment of the disclosure.

Referring to FIG. 10, a reinforcement learning apparatus 1050 may transmit priority information 1010 as an action to an environment 1000, such that a handover procedure between a BS and a UE may be performed in the environment 1000. The environment 1000 may transmit, to the reinforcement learning apparatus 1050, a state 1030 of a relation between the BS and the UE after a preset period of time and reward with respect to a data throughput of each BS.

In an embodiment of the disclosure, the reinforcement learning apparatus 1050 may control input data to be controlled based on a predefined operation rule or an AI model, the input data being derived from a received control signal and a received data signal.

The predefined operation rule or the AI model may be made through training. Herein, when the predefined operation rule or the AI model is made through training, it may mean that a basic AI model is trained by using multiple training data based on a learning algorithm so as to execute desired characteristics (or purpose), thus making the predefined operation rule or AI model. Such training may be performed by a BS or network entity on which AI according to the disclosure is implemented or by a separate server and/or a system. Examples of the learning algorithm may include, but are not limited to, supervised learning, unsupervised learning, semi-supervised learning, or reinforcement learning.

The AI model may include a plurality of neural network layers. Each of the plurality of neural network layers has a plurality of weight values, and performs a neural network operation through an operation between an operation result of a previous layer and the plurality of weight values. The plurality of weight values of the plurality of neural network layers may be optimized due to a training result of the AI model. For example, the plurality of weight values may be updated to reduce or minimize a loss value or a cost value obtained by the AI model during a training process. Examples of the AI neural network may include a DNN, a CNN, a RNN, a RBM, a DBN, a BRDNN, and a DQN, but are not limited to the aforementioned examples.

In an embodiment of the disclosure, a first UE 1001 may access a network via a first BS 1021 that is a serving BS and may be provided a service, and then may transmit a measurement report message to the first BS 1021. The measurement report message may include information for the first UE 1001 to perform a handover procedure. For example, the measurement report message may include information indicating that a signal received from the first BS 1021 is equal to or less than preset power. The first BS 1021 may transmit a current data throughput 1020 and a first state to the reinforcement learning apparatus 1050. For example, the first state may be as in Table below.

TABLE 1

|  | The number of rr UEs | The number of act UEs | Data rate |
| --- | --- | --- | --- |
| First BS 1021 | 70 | 60 | 30 Mbps |
| Second BS 1023 | 80 | 50 | 60 Mbps |
| Third BS 1025 | 80 | 60 | 40 Mbps |
| Fourth BS 1027 | 60 | 30 | 60 Mbps |
| Fifth BS 1029 | 40 | 20 | 70 Mbps |
| Sixth BS 1031 | 30 | 10 | 40 Mbps |

IT UE may refer to a UE that is connected to a BS, and may include a UE (active-state UE) that accesses a network via the BS and is provided a service, and a UE (idle-state UE) that accesses the network via the BS but is not provided a service. Also, act UE may include a UE (active-state UE) that is actually provided a service from among UEs connected to the BS. The data rate may refer to a speed at which a BS transmits data to a UE.

The reinforcement learning apparatus 1050 may obtain priority information, in response to an input of the first state and a first data throughput. For example, the reinforcement learning apparatus 1050 may generate first priority information by using a DNN in response to the input of the first state and the first data throughput. The first priority information may be as below.

TABLE 2

|  | The number of UEs on which handover has to be performed | Weight of priority |
| --- | --- | --- |
| First BS 1021 | 40 | 10 |
| Second BS 1023 | 10 | 80 |
| Third BS 1025 | 30 | 40 |
| Fourth BS 1027 | 20 | 60 |
| Fifth BS 1029 | 3 | 90 |
| Sixth BS 1031 | 35 | 20 |

Each of a plurality of BSs may receive priority information and may transmit the priority information to a UE. The reinforcement learning apparatus 1050 may transmit only a weight of priority in the first priority information, or may transmit information including the first priority information and information about the number of UEs on which handover has to be performed. Based on the first priority information, the first UE 1001 may perform a handover procedure with the second BS 1023 having high weight of priority from among the second BS 1023 and the third BS 1025 that are adjacent BSs.

After a preset period of time, the environment 1000 may transmit, to the reinforcement learning apparatus 1050, a second state and a second data throughput in response to handover of at least one UE. The reinforcement learning apparatus 1050 may identify reward as +when the second data throughput is generally increased, compared to the first data throughput, and may identify reward as—when the second data throughput is generally decreased, compared to the first data throughput. In an embodiment of the disclosure, the second state may be as below.

TABLE 3

|  | The number of rr UEs | The number of act UEs | Data rate |
| --- | --- | --- | --- |
| First BS 1021 | 50 | 40 | 60 Mbps |
| Second BS 1023 | 110 | 80 | 30 Mbps |
| Third BS 1025 | 70 | 50 | 60 Mbps |
| Fourth BS 1027 | 70 | 40 | 50 Mbps |
| Fifth BS 1029 | 40 | 20 | 70 Mbps |
| Sixth BS 1031 | 30 | 10 | 40 Mbps |

In an embodiment of the disclosure, the reinforcement learning apparatus 1050 may obtain second priority information, based on the second state and the second data throughput. For example, the reinforcement learning apparatus 1050 may generate the second priority information by using a DQN in response to an input of the second state and the second data throughput. The second priority information may be as below.

TABLE 4

|  | The number of UEs on which handover has to be performed | Weight of priority |
| --- | --- | --- |
| First BS 1021 | 20 | 60 |
| Second BS 1023 | 40 | 10 |
| Third BS 1025 | 20 | 50 |
| Fourth BS 1027 | 30 | 20 |
| Fifth BS 1029 | 3 | 90 |
| Sixth BS 1031 | 10 | 80 |

The reinforcement learning apparatus 1050 may transmit the second priority information to each of the plurality of BSs. For example, the reinforcement learning apparatus 1050 may transmit only a weight of priority in the second priority information to each of the plurality of BSs. Alternatively, the reinforcement learning apparatus 1050 may transmit, to each of the plurality of BSs, the entire second priority information including a weight associated with priority and information about the number of UEs on which handover has to be performed. In an embodiment of the disclosure, a second UE 1003 may access the network via the second BS 1023 that is a serving BS and may be provided a service, and then may transmit a measurement report message to the second BS 1023. The measurement report message may include information for the second UE 1003 to perform a handover procedure. For example, the measurement report message may include information indicating that a signal received from the second BS 1023 is equal to or less than preset power. The second BS 1023 may transmit the second priority information to the second UE 1003.

In an embodiment of the disclosure, based on the second priority information, the second UE 1003 may perform a handover procedure with the first BS 1021 as a target BS whose weight of priority is the highest from among adjacent BSs.

In another embodiment of the disclosure, when the second UE 1003 cannot perform the handover procedure with the first BS 1021, the second UE 1003 may perform a handover procedure with the third BS 1025 having a second-highest weight. That is, in consideration of a small difference between the weight of the third BS 1025 and the weight of the first BS 1021, the second UE 1003 may perform the handover procedure with the third BS 1025, not with the first BS 1021.

After a preset period of time, the environment 1000 may transmit, to the reinforcement learning apparatus 1050, a third state and a third data throughput in response to handover of at least one UE. The reinforcement learning apparatus 1050 may identify reward as +when the third data throughput is generally increased, compared to the second data throughput, and may identify reward as —when the third data throughput is generally decreased, compared to the second data throughput. In an embodiment of the disclosure, the third state may be as below.

TABLE 5

|  | The number of rr UEs | The number of act UEs | Data rate |
| --- | --- | --- | --- |
| First BS 1021 | 80 | 60 | 40 Mbps |
| Second BS 1023 | 100 | 70 | 30 Mbps |
| Third BS 1025 | 80 | 60 | 50 Mbps |
| Fourth BS 1027 | 80 | 30 | 70 Mbps |
| Fifth BS 1029 | 50 | 40 | 40 Mbps |
| Sixth BS 1031 | 30 | 20 | 80 Mbps |

In an embodiment of the disclosure, the reinforcement learning apparatus 1050 may obtain third priority information, based on the third state and the third data throughput. For example, the reinforcement learning apparatus 1050 may generate the third priority information by using a neural network in response to an input of the third state and the third data throughput. The third priority information may be as below.

TABLE 6

|  | The number of UEs on which handover has to be performed | Weight of priority |
| --- | --- | --- |
| First BS 1021 | 40 | 30 |
| Second BS 1023 | 60 | 10 |
| Third BS 1025 | 30 | 70 |
| Fourth BS 1027 | 20 | 80 |
| Fifth BS 1029 | 30 | 50 |
| Sixth BS 1031 | 10 | 95 |

The reinforcement learning apparatus 1050 may transmit the third priority information to each of the plurality of BSs. For example, the reinforcement learning apparatus 1050 may transmit only a weight of priority in the third priority information to each of the plurality of BSs. Alternatively, the reinforcement learning apparatus 1050 may transmit, to each of the plurality of BSs, the entire third priority information including a weight of priority and information about the number of UEs on which handover has to be performed. In an embodiment of the disclosure, a fourth UE 1007 may access the network via the second BS 1023 that is a serving BS and may be provided a service, and then may transmit a measurement report message to the second BS 1023. Also, the fourth UE 1007 may access the network via the third BS 1025 that is a serving BS and may be provided a service, and then may transmit a measurement report message to the third BS 1025. The second BS 1023 may transmit the third priority information to a third UE 1005, and the third BS 1025 may transmit the third priority information to the fourth UE 1007. Based on the third priority information, the third UE 1005 and the fourth UE 1007 may each perform a handover procedure with a target BS that is a BS whose weight of priority is high from among adjacent BSs. For example, the third UE 1005 may determine the third BS 1025 as a target BS, the fourth UE 1007 may determine the fifth BS 1029 as a target BS, and then the third UE 1005 and the fourth UE 1007 may perform a handover procedure with the respective target BSs.

After a preset period of time, the environment 1000 may transmit, to the reinforcement learning apparatus 1050, a fourth state and a fourth data throughput in response to handover of at least one UE. The reinforcement learning apparatus 1050 may identify reward as +when the fourth data throughput is generally increased, compared to the third data throughput, and may identify reward as—when the fourth data throughput is generally decreased, compared to the third data throughput. In an embodiment of the disclosure, the fourth state may be as below.

TABLE 7

|  | The number of rr UEs | The number of act UEs | Data rate |
| --- | --- | --- | --- |
| First BS 1021 | 80 | 50 | 50 Mbps |
| Second BS 1023 | 90 | 50 | 50 Mbps |
| Third BS 1025 | 80 | 60 | 40 Mbps |
| Fourth BS 1027 | 80 | 50 | 50 Mbps |
| Fifth BS 1029 | 80 | 60 | 40 Mbps |
| Sixth BS 1031 | 30 | 20 | 80 Mbps |

In an embodiment of the disclosure, the reinforcement learning apparatus 1050 may obtain fourth priority information, based on the fourth state and the fourth data throughput. For example, the reinforcement learning apparatus 1050 may generate the fourth priority information by using a learning network in response to an input of the fourth state and the fourth data throughput. The fourth priority information may be as below.

TABLE 8

|  | The number of UEs on which handover has to be performed | Weight of priority |
| --- | --- | --- |
| First BS 1021 | 40 | 40 |
| Second BS 1023 | 30 | 60 |
| Third BS 1025 | 30 | 70 |
| Fourth BS 1027 | 40 | 20 |
| Fifth BS 1029 | 50 | 10 |
| Sixth BS 1031 | 10 | 85 |

The reinforcement learning apparatus 1050 may transmit the fourth priority information to each of the plurality of BSs. For example, the reinforcement learning apparatus 1050 may transmit only a weight of priority in the fourth priority information to each of the plurality of BSs. Alternatively, the reinforcement learning apparatus 1050 may transmit, to each of the plurality of BSs, the entire fourth priority information including a weight of priority and information about the number of UEs on which handover has to be performed. In an embodiment of the disclosure, a fifth UE 1009 may access the network via the second BS 1023 that is a serving BS and may be provided a service, and then may transmit a measurement report message to the second BS 1023. Also, a sixth UE 1011 may transmit a measurement report message to the sixth BS 1031 that is a serving BS. Accordingly, the second BS 1023 may transmit the fourth priority information to the fifth UE 1009, and the sixth BS 1031 may transmit the fourth priority information to the sixth UE 1011. Based on the fourth priority information, the fifth UE 1009 and the sixth UE 1011 may each perform a handover procedure with a target BS that is a BS whose weight of priority is high from among adjacent BSs. For example, the fifth UE 1009 may determine the fourth BS 1027 as a target BS, the sixth UE 1011 may determine the sixth BS 1031 as a target BS, and then the fifth UE 1009 and the sixth UE 1011 may perform a handover procedure with the respective target BSs.

After a preset period of time, the plurality of BSs may each transmit a new state and a new data throughput to a reinforcement learning apparatus. Accordingly, the reinforcement learning apparatus may determine, by using reinforcement learning, priority information for optimal load balancing The priority information may include, but is not limited to, the number of UEs on which handover has to be performed, weights of priorities, indicators indicating that the priorities, or the like.

Figure 11:
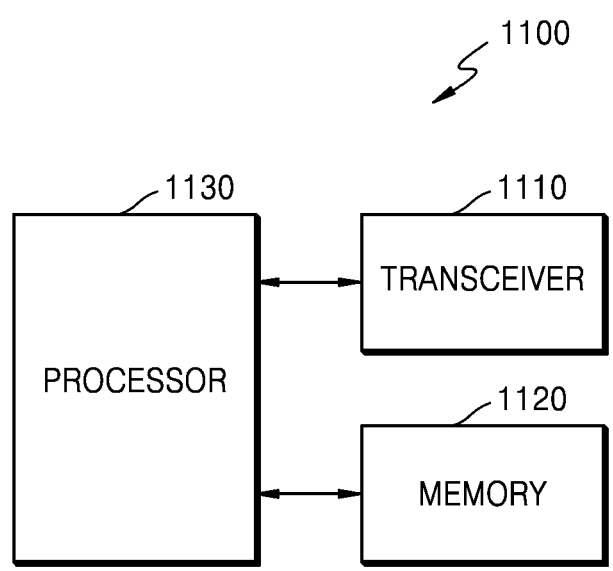
FIG. 11 is a block diagram illustrating a configuration of a reinforcement learning apparatus, according to an embodiment of the disclosure.

FIG. 11 is a block diagram illustrating a configuration of a reinforcement learning apparatus 1100, according to an embodiment of the disclosure.

Referring to FIG. 11 the reinforcement learning apparatus 1100 may include a transceiver 1110, a memory 1120, and a processor 1130. However, not every element shown in FIG. 11 is an essential element of the reinforcement learning apparatus 1100. The reinforcement learning apparatus 1100 may be embodied with more elements than the shown elements of FIG. 11 or may be embodied with fewer elements than the shown elements of FIG. 11. Furthermore, the transceiver 1110, the memory 1120, and the processor 1130 may be implemented as one chip. In an embodiment of the disclosure, the reinforcement learning apparatus 1100 may correspond to the reinforcement learning apparatus 600 described with reference to FIG. 6. For example, the transceiver 1110 may correspond to the transceiver 610 described with reference to FIG. 6, the memory 1120 may correspond to the memory 620 described with reference to FIG. 6, and the processor 1130 may correspond to the processor 630 described with reference to FIG. 6

In an embodiment of the disclosure, the transceiver 1110 may communicate with a BS, a UE, or another electronic device which are connected to the reinforcement learning apparatus 1100 by wire or wirelessly. For example, the transceiver 1110 may receive information about a BS and a UE from each of a plurality of BSs. Also, the transceiver 1110 may transmit priority information to each of the plurality of BSs.

In an embodiment of the disclosure, the memory 1120 may have installed and stored therein programs such as applications and various types of data such as files. The processor 1130 may access and use the data stored in the memory 1120, or may store new data in the memory 1120. In an embodiment of the disclosure, the memory 1120 may include a database. In an embodiment of the disclosure, the memory 1120 may store data usage information and priority information about the plurality of BSs, based on states.

In an embodiment of the disclosure, the processor 1130 may control all operations of the reinforcement learning apparatus 1100, and may include at least one or more of processors including a CPU, a GPU, and the like. The processor 1130 may control elements included in the reinforcement learning apparatus 1100 to perform operations for operating the reinforcement learning apparatus 1100. For example, the processor 1130 may execute a program stored in the memory 1120, may read a file stored in the memory 1120, or may store a new file in the memory 1120. In an embodiment of the disclosure, the processor 1130 may perform an operation for operating the reinforcement learning apparatus 1100, by executing the program stored in the memory 1120. For example, a processor may receive first information about a relation between a BS and a UE from each of a plurality of BSs, may determine, based on the first information, the number of UEs on which handover has to be performed from among UEs served by each of the plurality of BSs, and may transmit priority information to each of the plurality of BSs, the priority information being determined based on the number of UEs.

Figure 12:
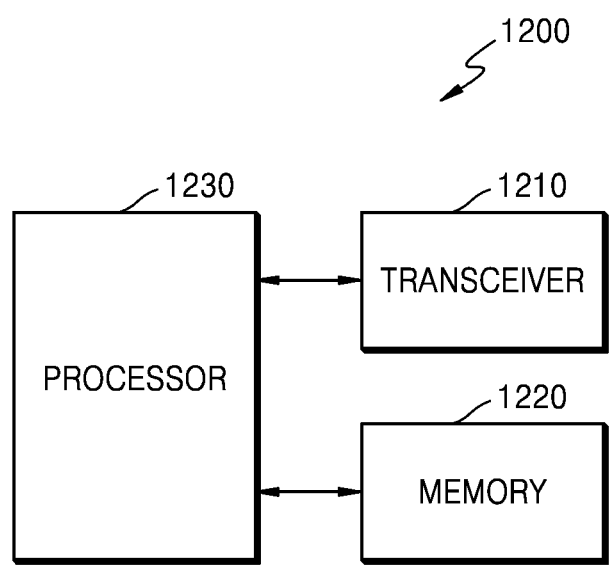
FIG. 12 is a block diagram illustrating a configuration of a BS, according to an embodiment of the disclosure.

FIG. 12 is a block diagram illustrating a configuration of a BS 1200, according to an embodiment of the disclosure.

Referring to FIG. 12, the BS 1200 may include a processor 1230, a memory 1220, and a transceiver 1210. The processor 1230, the memory 1220, and the transceiver 1210 of the BS 1200 may operate according to the aforementioned communication schemes of the BS. However, elements of the BS 1200 are not limited to the above example. For example, the BS 1200 may include more elements than the aforementioned elements or may include fewer elements than the aforementioned elements. Furthermore, the processor 1230, the memory 1220, and the transceiver 1210 may be implemented as one chip. Also, the processor 1230 may refer to one or more processors.

A transmitter and a receiver of the BS 1200 may be collectively referred to as the transceiver 1210, and the transceiver 1210 may transmit or receive a signal to or from a UE or a network entity. The signal transmitted to or received from the UE or the network entity may include control information and data. To this end, the transceiver 1210 may include a RF transmitter for up-converting a frequency of and amplifying signals to be transmitted, and an RF receiver for low-noise-amplifying and down-converting a frequency of received signals. However, this is merely an example of the transceiver 1210, and thus elements of the transceiver 1210 are not limited to the RF transmitter and the RF receiver.

Also, the transceiver 1210 may receive signals through wireless channels and output the signals to the processor 1230, and may transmit signals output from the processor 1230, through wireless channels.

The memory 1220 may store programs and data necessary for operations of the BS 1200. Also, the memory 1220 may store control information or data which are included in a signal obtained by the BS 1200. The memory 1220 may be implemented as a storage medium including a ROM, a RAM, a hard disk, a CD-ROM, a DVD, or the like, or any combination thereof. Alternatively, the memory 1220 may not be separately arranged but may be included in the processor 1230.

The processor 1230 may control a series of processes to allow the BS 1200 to operate according to the aforementioned embodiments of the disclosure. For example, the processor 1230 may receive a control signal and a data signal by using the transceiver 1210, and may process the received control signal and the received data signal. Also, the processor 1230 may transmit the processed control signal and the processed data signal by using the transceiver 1210. Also, the processor 1230 may configure Downlink Control Information (DCI) including allocation information with respect to a Physical Downlink Shared Channel (PDSCH), and may control each element in the BS 1200 so as to transmit the DCI.

In an embodiment of the disclosure, the processor 1230 may obtain information about a plurality of BSs based on a measurement report received from at least one UE, the plurality of BSs transmitting a signal with at least preset power to the at least one UE; based on the information about a plurality of BSs, may transmit first information about a relation between the BS and the at least one UE to a reinforcement learning apparatus; may receive, from the reinforcement learning apparatus, priority information determined based on the number of UEs on which handover has to be performed from among UEs served by the BS; and may perform a handover procedure with at least one UE by transmitting the priority information to the at least one UE.

Figure 13:
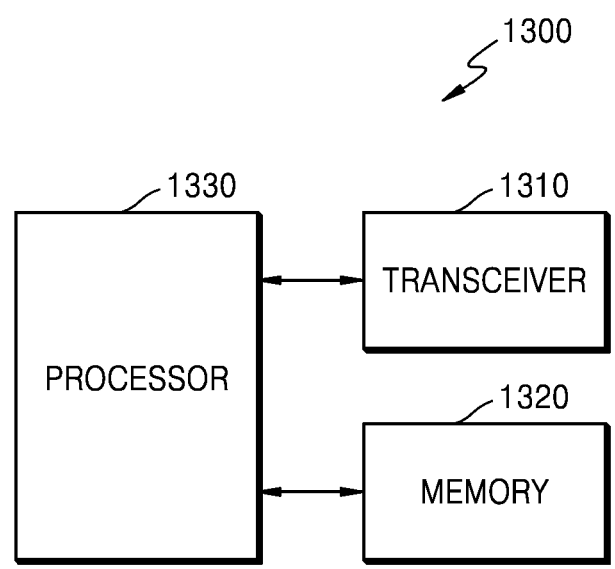
FIG. 13 is a block diagram illustrating a configuration of a UE, according to an embodiment of the disclosure.

FIG. 13 is a block diagram illustrating a configuration of a UE 1300, according to an embodiment of the disclosure.

Referring to FIG. 13, the UE 1300 may include a processor 1330, a memory 1320, and a transceiver 1310. The processor 1330, the memory 1320, and the transceiver 1310 of the UE 1300 may operate according to the aforementioned communication schemes of the UE 1300. However, elements of the UE 1300 are not limited to the above example. For example, the UE 1300 may include more elements than the aforementioned elements or may include fewer elements than the aforementioned elements. Furthermore, the processor 1230, the memory 1220, and the transceiver 1210 may be implemented as one chip. Also, the processor 1230 may refer to one or more processors.

A transmitter and a receiver of the UE 1300 may be collectively referred to as the transceiver 1310, and the transceiver 1310 may transmit or receive a signal to or from a network entity, a BS, or another UE. The signal transmitted to or received from the network entity, the BS, or the other UE may include control information and data. To this end, the transceiver 1310 may include a RF transmitter for up-converting a frequency of and amplifying signals to be transmitted, and an RF receiver for low-noise-amplifying and down-converting a frequency of received signals. However, this is merely an example of the transceiver 1310, and thus elements of the transceiver 1310 are not limited to the RF transmitter and the RF receiver.

Also, the transceiver 1310 may receive signals through wireless channels and output the signals to the processor 1330, and may transmit signals output from the processor 1330, through wireless channels.

The memory 1320 may store programs and data necessary for operations of the UE 1300. Also, the memory 1320 may store control information or data which are included in a signal obtained by the UE 1300. The memory 1320 may be implemented as a storage medium including a ROM, a RAM, a hard disk, a CD-ROM, a DVD, or the like, or any combination thereof. Alternatively, the memory 1320 may not be separately arranged but may be included in the processor 1330.

The processor 1330 may control a series of processes to allow the UE 1300 to operate according to the aforementioned embodiments of the disclosure. For example, the processor 1330 may receive a control signal and a data signal by using the transceiver 1310, and may process the received control signal and the received data signal. Also, the processor 1330 may transmit the processed control signal and the processed data signal by using the transceiver 1310. Also, the processor 1330 may control elements of the UE 1300 to receive DCI configured of two layers and thus to simultaneously receive a plurality of PDSCHs.

In an embodiment of the disclosure, the processor 1330 may transmit a measurement report to a BS, based on a measurement configuration received from the BS; may receive, from the BS, a request for information about at least one adjacent BS transmitting a signal with at least preset power to the UE; may transmit, based on the request for the information, a second measurement report including the information about at least one adjacent BS to the BS; may receive priority information from the BS; and may perform a handover procedure with a new BS, based on the priority information.

Some embodiments of the disclosure may be embodied as a computer-readable recording medium, e.g., a program module to be executed in computers, which includes computer-readable instructions. The computer-readable recording medium may include any usable medium that may be accessed by computers, volatile and non-volatile medium, and detachable and non-detachable medium. Also, the computer-readable recording medium may include a computer storage medium. The computer storage medium includes all volatile and non-volatile media, and detachable and non-detachable media which are technically implemented to store information including computer-readable instructions, data structures, program modules or other data.

The embodiments of the disclosure may be implemented in a software (S/W) program including instructions stored in a computer-readable storage medium.

The computer is a device capable of calling the stored instructions from the storage medium and operating according to the embodiments of the disclosure in accordance with the called instructions, and may include an electronic device according to the embodiments/

The computer-readable storage medium may be provided in the form of a non-transitory storage medium. Here, the term 'non-transitory' means that the storage medium is tangible and does not refer to a transitory electrical signal, but does not distinguish that data is stored semi-permanently or temporarily on the storage medium.

Furthermore, a control method according to the embodiments of the disclosure may be provided in a computer program product. The computer program product may be traded between a seller and a purchaser as a commodity.

The computer program product may include an S/W program and a computer-readable storage medium having stored thereon the S/W program. For example, the computer program product may include a product (e.g. a downloadable application) in an S/W program distributed electronically through a manufacturer of an electronic device or an electronic market (e.g., Google™ Play Store and App Store). For electronic distribution, at least a part of the S/W program may be stored on the storage medium or may be generated temporarily. In this case, the storage medium may be a storage medium of a server of the manufacturer, a server of the electronic market, or a relay server for temporarily storing the S/W program.

The computer program product may include a storage medium of a server or a storage medium of an electronic device, in a system including the server and the electronic device. Alternatively, when there is a third device (e.g., a smartphone) that communicates with the server or the electronic device, the computer program product may include a storage medium of the third device. Alternatively, the computer program product may include an S/W program that is transmitted from the server to the electronic device or the third device or from the third device to the electronic device.

In this case, one of the server, the electronic device, and the third device may perform the method according to the embodiments of the disclosure by executing the computer program product. Alternatively, at least two of the server, the electronic device, and the third device may divide and perform the method according to the embodiments of the disclosure by executing the computer program product.

For example, the server (e.g., a cloud server, an AI server, or the like) may execute the computer program product stored in the server, thereby controlling the electronic device to perform the method according to the embodiments of the disclosure, the electronic device communicating with the server.

As another example, the third device may execute the computer program product, thereby controlling the electronic device to perform the method according to the embodiments of the disclosure, the electronic device communicating with the third device. When the third device executes the computer program product, the third device may download the computer program product from the server, and may execute the downloaded computer program product. Alternatively, the third device may perform the method according to the embodiments of the disclosure by executing a pre-loaded computer program product.

Throughout the specification, the term "unit" may indicate a hardware component such as a processor or a circuit, and/or may indicate a software component that is executed by a hardware configuration such as a processor.

While the disclosure has been particularly shown and described with reference to the accompanying drawings, in which embodiments of the disclosure are shown, it is obvious to one of ordinary skill in the art that the disclosure may be easily embodied in many different forms without changing the technical concept or essential features of the disclosure. Thus, it should be understood that the embodiments described herein should be considered in a descriptive sense only and not for purposes of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A reinforcement learning apparatus in a wireless communication system, the reinforcement learning apparatus comprising:
    a transceiver;
    a memory storing one or more instructions; and
    at least one processor connected with the transceiver and configured to execute the one or more instructions stored in the memory to:
        receive, from each of a plurality of base stations (BSs), first information about a relation between a corresponding BS and one or more user equipments (UEs) in coverage of the BS,
        determine, based on the first information received from each of the plurality of BSs, a number of UEs on which handover is to be performed from among UEs served by a corresponding BS, and
        transmit, to each of the plurality of BSs, priority information comprising a handover order or handover weights associated with the plurality of BSs, wherein the priority information is determined by the reinforcement learning apparatus based on the number of UEs on which handover is to be performed.

2. The reinforcement learning apparatus of claim 1, wherein the at least one processor is further configured to execute the one or more instructions to:
    receive, from each of the plurality of BSs, UE handover information about handover of the one or more UEs in coverage of the BS, based on the priority information transmitted to each of the plurality of BSs,
    obtain a data throughput per BS with respect to the plurality of BSs,
    determine an updated number of UEs on which handover is to be performed from among the UEs served by the BS, based on the UE handover information and the data throughput per BS, and
    transmit, to each of the plurality of BSs, priority information determined based on the updated number of UEs.

3. The reinforcement learning apparatus of claim 1, wherein the first information comprises at least one of information about a number of UEs connected to each of the plurality of BSs, information about a number of idle-state UEs connected to each of the plurality of BSs, information about a number of active-state UEs connected to each of the plurality of BSs, or information about a total volume of data used by UEs connected to each of the plurality of BSs.

4. A base station (BS) in a wireless communication system, the BS comprising:
    a transceiver;
    a memory storing one or more instructions; and
    at least one processor connected with the transceiver and configured to execute the one or more instructions stored in the memory to:
        obtain information about the BS based on a measurement report received from one or more user equipments (UEs) in coverage of the BS, the BS transmitting a signal with at least preset power to the one or more UEs,
        based on the information about the BS, transmit first information about a relation between the BS and the one or more UEs to a reinforcement learning apparatus,
        receive, from the reinforcement learning apparatus, priority information comprising a handover order or handover weights associated with a plurality of BSs, wherein the priority information is determined by the reinforcement learning apparatus based on a number of UEs on which handover is to be performed from among UEs served by the BS, and
        perform a handover procedure with at least one UE by transmitting the priority information to the at least one UE.

5. The BS of claim 4, wherein the first information comprises at least one of information about a number of UEs connected to each of the plurality of BSs, information about a number of idle-state UEs connected to each of the plurality of BSs, information about a number of active-state UEs connected to each of the plurality of BSs, or information about a total volume of data used by UEs connected to each of the plurality of BSs.

6. The BS of claim 4, wherein the at least one processor is further configured to execute the one or more instructions to:
    transmit a measurement configuration to the one or more UEs,
    receive a first measurement report from the one or more UEs, in response to the transmitted measurement configuration,
    request the one or more UEs for information about one BS based on the first measurement report, the one BS transmitting a signal with at least the preset power,
    in response to the request for the information, receive, from the one or more UEs, a second measurement report comprising the information about the at least one BS transmitting a signal with at least the preset power, and obtain, based on the second measurement report, the information about the at least one BS that transmits a signal with at least the preset power to the at least one UE.

7. The BS of claim 4, wherein the at least one processor is further configured to execute the one or more instructions to:
based on the measurement report received from the one or more UEs, identify an adjacent BS transmitting a signal with at least the preset power to the one or more UEs,
request the identified adjacent BS for adjacent BS information, and
obtain information about a plurality of BSs by receiving the adjacent BS information from the adjacent BS.

8. The BS of claim 7, wherein the adjacent BS information comprises at least one of information about a number of UEs connected to the adjacent BS, information about a number of idle-state UEs connected to the adjacent BS, information about a number of active-state UEs connected to the adjacent BS, a total volume of data used by UEs connected to the adjacent BS, or information about a ratio of radio resources used by the UEs connected to the adjacent BS.

9. The BS of claim 4, wherein the at least one processor is further configured to execute the one or more instructions to:
identify a number of UEs on which handover has been performed, based on the priority information, and
transmit, to the reinforcement learning apparatus, the identified number of the UEs that have performed handover.

10. The BS of claim 4, wherein the at least one processor is further configured to execute the one or more instructions to:
perform a handover procedure, based on the priority information, and then determine a volume of data usage of the BS, and
transmit the determined volume of data usage to the reinforcement learning apparatus.

11. An operating method of a reinforcement learning apparatus in a wireless communication system, the operating method comprising:
receiving, from each of a plurality of base stations (BSs), first information about a relation between a corresponding (BS) and one or more user equipments (UEs) in coverage of the BS;
determining, based on the first information received from each of the plurality of BSs, a number of UEs on which handover is to be performed from among UEs served by a corresponding BS; and
transmitting, to each of the plurality of BSs, priority information comprising a handover order or handover weights associated with the plurality of BSs, wherein the priority information is determined by the reinforcement learning apparatus based on the number of UEs on which handover is to be performed.

12. The operating method of claim 11, further comprising:
receiving, from each of the plurality of BSs, UE handover information about handover of the one or more UEs in coverage of the BS, based on the priority information transmitted to each of the plurality of BSs;
obtaining a data throughput per BS with respect to the plurality of BSs;
determining an updated number of UEs on which handover is to be performed from among the UEs served by the BS, based on the UE handover information and the data throughput per BS; and
transmitting, to each of the plurality of BSs, priority information determined based on the updated number of UEs.

13. The operating method of claim 11, wherein the first information comprises one of information about a number of UEs connected to each of the plurality of BSs, information about a number of idle-state UEs connected to each of the plurality of BSs, information about a number of active-state UEs connected to each of the plurality of BSs, or information about a total volume of data used by UEs connected to each of the plurality of BSs.

14. An operating method of a base station (BS) in a wireless communication system, the operating method comprising:
obtaining information about the BS based on a measurement report received from one or more user equipments (UE) in coverage of the BS, the BS transmitting a signal with at least preset power to the one or more UEs;
based on the information about the BS, transmitting first information about a relation between the BS and the one or more UEs to a reinforcement learning apparatus;
receiving, from the reinforcement learning apparatus, priority information comprising a handover order or handover weights associated with a plurality of BSs, wherein the priority information is determined by the reinforcement learning apparatus based on a number of UEs on which handover is to be performed from among UEs served by the BS; and
performing a handover procedure with at least one UE by transmitting the priority information to the one UE.

15. The operating method of claim 14, wherein the first information comprises one of information about a number of UEs connected to each of the plurality of BSs, information about a number of idle-state UEs connected to each of the plurality of BSs, information about a number of active-state UEs connected to each of the plurality of BSs, or information about a total volume of data used by UEs connected to each of the plurality of BSs.

16. The operating method of claim 14, wherein the obtaining of the information about the plurality of BSs comprises:
transmitting a measurement configuration to the one or more UEs,
receiving a first measurement report from the one or more UEs, in response to the transmitted measurement configuration,
requesting the one or more UEs for information about at least one BS based on the first measurement report, the at least one BS transmitting a signal with at least preset power,
in response to the request for the information, receiving, from the one or more UEs, a second measurement report comprising the information about the at least one BS transmitting a signal with at least the preset power, and
obtaining, based on the second measurement report, the information about the at least one BS that transmits a signal with at least the preset power to the at least one UE.

17. The operating method of claim 14, wherein the obtaining of the information about the plurality of BSs comprises:
based on the measurement report received from the one or more UEs, identifying an adjacent BS transmitting a signal with at least the preset power to the one or more UEs, requesting the identified adjacent BS for adjacent BS information, and obtaining information about a plurality of BSs by receiving the adjacent BS information from the adjacent BS.

18. The operating method of claim 17, wherein the adjacent BS information comprises at least one of information about a number of UEs connected to the adjacent BS, information about a number of idle-state UEs connected to the adjacent BS, information about a number of active-state UEs connected to the adjacent BS, a total volume of data used by UEs connected to the adjacent BS, or information about a ratio of radio resources used by the UEs connected to the adjacent BS.

19. The operating method of claim 14, further comprising:

identifying a number of UEs on which handover has been performed, based on the priority information; and transmitting, to the reinforcement learning apparatus, the identified number of the UEs that have performed handover.

20. The operating method of claim 14, further comprising:

performing a handover procedure, based on the priority information, and then determining a volume of data usage of the BS; and transmitting the determined volume of data usage to the reinforcement learning apparatus.

* * * * *